(12) United States Patent  (10) Patent No.: US 7,417,617 B2
Eichenlaub  (45) Date of Patent: Aug. 26, 2008

(54) ENHANCED RESOLUTION FOR IMAGE GENERATION

(75) Inventor: Jesse B. Eichenlaub, Rochester, NY (US)

(73) Assignee: Dimension Technologies, Inc., Rochester, NY (US)

( * ) Notice: Subject to any disclaimer, the term of this patent is extended or adjusted under 35 U.S.C. 154(b) by 581 days.

(21) Appl. No.: 10/832,029

(22) Filed: Apr. 26, 2004

(65) Prior Publication Data

US 2004/0196253 A1  Oct. 7, 2004

Related U.S. Application Data

(63) Continuation-in-part of application No. 09/313,953, filed on May 18, 1999, now Pat. No. 6,734,838.

(51) Int. Cl.
G09G 3/36 (2006.01)

(52) U.S. Cl. .................. 345/102; 345/204
(58) Field of Classification Search ......... 345/102, 345/204
See application file for complete search history.

(56) References Cited

U.S. PATENT DOCUMENTS

| | | |
|---|---|---|
| 5,036,385 A | 7/1991 | Eichenlaub |
| 5,410,345 A | 4/1995 | Eichenlaub |
| 5,428,366 A | 6/1995 | Eichenlaub |
| 5,444,551 A | 8/1995 | Miller et al. |
| 5,581,385 A | 12/1996 | Spitzer et al. |
| 5,616,912 A | 4/1997 | Robinson et al. |
| 5,673,059 A | 9/1997 | Zavracky et al. |
| 5,817,255 A | 10/1998 | Tanaka et al. |
| 5,822,021 A | 10/1998 | Johnson et al. |
| 5,847,784 A | 12/1998 | Finnila et al. |
| 5,949,503 A | 9/1999 | Koyama et al. |
| 6,017,123 A | 1/2000 | Bleha et al. |
| 6,052,231 A | 4/2000 | Rosenbluth |
| 6,053,615 A | 4/2000 | Peterson et al. |
| 6,120,152 A | 9/2000 | Nakayama et al. |
| 6,249,378 B1 | 6/2001 | Shimamura et al. |
| 6,331,878 B1 | 12/2001 | Takahara |
| 6,333,770 B1 | 12/2001 | Omae et al. |
| 6,368,760 B1 | 4/2002 | Nishiguchi |

OTHER PUBLICATIONS

Eichenlaub, J. "A Unique Photonics System Design that Increases the Resolution of an LCD," Electroluminescent Materials, Devices, and Large Screen Displays. Proceedings of the SPIE, vol. 1910, pp. 259-267, Bellingham, WA: Society of Photo-Optical Instrumentation Engineers, Feb. 1993.
Eichenlaub, J., Kataliaz, M. (1998) "Increased Resolution on an ICFLCD Display through Field-Sequential Subpixel Illumination," pp. 411-414.

*Primary Examiner*—Richard Hjerpe
*Assistant Examiner*—Leonid Shapiro
(74) *Attorney, Agent, or Firm*—Brown & Michaels, PC

(57) ABSTRACT

Images with enhanced resolution are created with a display device comprising a non-transmissive light valve including addressable pixels, a light source that directs light to the light valve, and a lens positioned between the light valve and the light source, the lens directing light from the light source to the pixels on the light valve and the light valve directing light to viewing optics. The light valve is an integrated circuit ferroelectric liquid crystal device (ICFLCD), or other light valve arrays such as a digital light processor (DLP) display, having an array of addressable pixels. Such light valves may be mounted in a head mounted display.

53 Claims, 13 Drawing Sheets

FIG. 10a

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |

FIG. 10b

| B | R | G | B | R | G |
|---|---|---|---|---|---|
| B | R | G | B | R | G |
| B | R | G | B | R | G |
| B | R | G | B | R | G |
| B | R | G | B | R | G |
| B | R | G | B | R | G |

FIG. 10c

| G | B | R | G | B | R |
|---|---|---|---|---|---|
| G | B | R | G | B | R |
| G | B | R | G | B | R |
| G | B | R | G | B | R |
| G | B | R | G | B | R |
| G | B | R | G | B | R |

Birefringent material 154
Birefringent material 150
$d_2$
152 Polarization rotator
$d_1$
148 Polarization rotator
146 Polarizer
Beamsplitter 144

Fly's eye lens 156
Microdisplay 142

ENHANCED RESOLUTION FOR IMAGE GENERATION

CROSS-REFERENCE TO RELATED APPLICATIONS

This application is a continuation-in-part of application Ser. No. 09/313,953, filed May 18, 1999 U.S. Pat. No. 6,734,838, issued on May 11, 2004, entitled Enhanced Resolution for Image Generation, which application is incorporated by reference herein.

STATEMENT REGARDING FEDERALLY SPONSORED RESEARCH OR DEVELOPMENT

Not Applicable.

REFERENCE TO A "SEQUENCE LISTING"

Not Applicable.

BACKGROUND OF THE INVENTION

1. Field of the Invention

This invention relates to a display device that creates very high resolution real time images. Several subregions within individual pixels of a display are illuminated in rapid succession while changing the transparency of each pixel as necessary just prior to each illumination period, thus creating an image made of the illuminated subregions instead of the pixels themselves. More particularly, this invention relates to an optical and illumination system that can be used to accomplish such sub pixel illumination, especially in combination with a reflective integrated circuit ferroelectric liquid crystal display (ICFLCD) or other reflective light valve arrays such as a digital light processor (DLP) display.

2. Description of Related Art

U.S. Pat. No. 5,036,385 (Eichenlaub) discloses an optical and illumination system whereby subregions of a transmissive LCD may be illuminated in succession so as to produce an image made of the subregions instead of the pixels themselves. The produced image thus may have a much higher resolution than the LCD itself. Furthermore, U.S. Pat. No. 5,410,345 (Eichenlaub) discloses a detailed construction and operation of an illumination system and optics that may be used to illuminate several subregions of each pixel in succession. U.S. Pat. No. 5,428,366 (Eichenlaub) discloses an optical and illumination system that can create high resolution color images that do not display color breakup by illuminating subregions of pixels in succession. The aforementioned devices were designed primarily with a transmissive, direct view LCD as the light valve.

There are now available a new class of light valves that are designed primarily for head mounted and projection applications. These devices, though relying on different, specific optical technologies to operate, are reflective, are miniature devices (e.g., measuring less than 20 mm on a side and possess pixels that are less than 20 microns on a side), and possess extremely fast address and pixel response rates. There are also various monochrome devices, with color images typically being created by field sequential color illumination or by combining the images of three displays, each illuminated by a different color. Examples are ICFLCDs and other non-transmissive LCDs. However, the optical and illumination system of the aforementioned Eichenlaub patents are not readily adaptable to such newer classes of light valves since they are non-transmissive to light.

Simple mathematics tells one that the display of images with resolution matching the eye's limit and having a sufficiently wide field of view (FOV) for head mounted device (HMD) applications requires an extremely high resolution display. The eye can resolve to less than 1 minute of arc, depending on ambient light, color, and other factors. One minute of arc will be used for illustrative purposes. A device that is capable of displaying one minute resolution would be made up of red, green, and blue pixel triads that subtend no more than ½ minute of arc. A display with pixels subtending ½ minute of arc and covering 80 degrees horizontally (the minimum that is considered acceptable, with 180 degrees or more considered the optimum), and somewhat less vertically (this would be 60 degrees for a display with a typical width to height ratio) would have a total resolution of 9600 triads by 7200 triads. Clearly such a display is far beyond the current state-of-the-art. Approximately 2000×2000 resolution is the best that has been attained on real time displays. 1280×1024 resolution is the highest available in commercial virtual reality systems using miniature cathode ray tubes (CRTs). The resolution of the more compact and lighter weight LCD based systems is much lower. Thus a state-of-the-art virtual reality display possesses less than 1/50th the number of pixels required for the vision limited resolution display just described.

One company, LEEP Systems, currently makes optics that partially overcome this problem by distorting the display—keeping it compressed and thus providing high angular resolution in the center, while stretching it at the edges to provide as much of a peripheral view as possible. Software corrects for this distortion on the image itself, which is rendered as a fish eye image on the display and looks normal when viewed through the optics. Resolution at the center of the FOV is improved by a factor of three. Since the human visual system can perceive high resolution only near the gaze point, and since an observer typically spends most of the time looking straight ahead, this system provides some improvement over other devices.

Recently, it has been proposed to incorporate high resolution inserts spanning 5 to 30 degrees (the best size to be determined experimentally) within low resolution LCD images. The high resolution inserts, if small enough could approach the human eyes resolution limit. The proposed system requires four LCDs, and would be rather bulky, with the extra LCDs mounted above or to the side of the user's head. Moving inserts have been implemented in helmet displays, where two helmet displays provide movable high resolution inserts within low resolution images by means of eye trackers, movable mirrors, and two thick fiber optic cables extending to remote displays and optics. Thus, such approaches to achieve eye limited resolution in HMD systems require bulky, heavy equipment that involves high resolution inserts in lower resolution fields.

Accordingly, it is an object of this invention to provide an optical and illumination system that may be used to accomplish sub pixel illumination with a reflective ICFLCD or other reflective light valve, and especially, illumination of subpixel regions in rapid succession.

It is another object of this invention to provide a display device that creates very high resolution real time images, including higher resolution than obtainable with the devices described in the aforementioned Eichenlaub patents.

It is another object of this invention to provide an optical and illumination system that may be used to direct light efficiently from a reflective light valve to a projection lens, in the case of a projected image, or to an eyepiece, in the case of a head mounted system.

It is another object of this invention to provide a relatively light weight LCD-based display device which can produce very high resolution images across the entire field without inserts, cumbersome equipment, or eye trackers.

It is yet another object of this invention to provide displays and associated optics systems that are higher in resolution, yet lighter in weight than present CRT imaging systems and roughly the same size as present LCD based virtual reality (VR) displays.

BRIEF SUMMARY OF THE INVENTION

This invention provides a display device comprising: a non transmissive light valve including addressable pixels; a light source that directs light to the light valve; and a lens positioned between the light valve and the light source, said lens directing light from the light source to the pixels on the light valve and the light valve directing light to viewing optics. Preferably, the light valve is an integrated circuit ferroelectric liquid crystal device, or other light valve arrays such as a digital light processor (DLP) display, having an array of addressable pixels.

The device may include a flys eye lens or lenticular lens adjacent the light valve, for example, the lens may be contained in a front transparent layer of an ICFLCD, with a layer of liquid crystal material arranged beneath the front transparent layer, and a reflective layer arranged beneath the liquid crystal material layer. Alternately, a flys eye lens or a lenticular lens may be spaced from the light valve, for example, a relay lens may be disposed between an ICFLCD and a flys eye or lenticular lens array.

Preferably, the device includes a reflector such as a partially reflective mirror positioned between the light source and the light valve, the reflector directing light from the light valve to viewing optics.

Light from the light source may be directed through a rotating color filter wheel comprising discrete sections of different color transparencies, in which case light from the color wheel may be received by a rotating prism. The focused beam of light from the prism may be directed to bundle ends of optical cables, with opposite bundle ends of the optical cables directing the focused beam of light to the light valve. Alternately, the light source may include individual sources of red, green and blue colored light, where the individual sources of light are synchronized to emit light of different colors in succession.

The invention also provides a head mounted display system comprising: a right eye light valve and a left eye light valve mounted in a head mounted display, each light valve being nontransmissive and including an array of addressable pixels; and an illumination system that provides focused light beams of different transparencies to each of the light valves, wherein the, focused beams are provided alternately to the light valves, and the each light valve is addressed while receiving no light. The display system preferably includes a light source external of the head mounted device, where light from the light source is directed to the light valves via optical cables. The light source may include a rotating color filter wheel comprising discrete sections of different color transparencies, employed in conjunction with a rotating prism that receives light from the color filter wheel and creates a focused beam of light directed to bundle ends of optical cables, with opposite bundle ends of the optical cables directing the focused beam of light to the light valve.

According to other aspects of the invention, there is provided a method of generating color images of high resolution, comprising: sequentially directing light of different colors from a light source to pixels on a non-transmissive light valve; and addressing the pixels of the light valve to modulate intensity of light to create different color components of an image in succession.

BRIEF DESCRIPTION OF THE SEVERAL VIEWS OF THE DRAWING(S)

FIG. 10a to 10c illustrate a sequential pattern of lines generated during scanning of pixels.

DETAILED DESCRIPTION OF THE INVENTION

LCDs are unique in that they do not form images by emitting light. Rather, they act as light valves to vary the intensity of light passing through them in order to form an image. This light can be emitted by a backlighter behind the LCD, or can be ambient illumination reflected by a mirror behind the LCD. An effective method of increasing the resolution of a liquid crystal display involves changing the patterns of light emitting regions which sequentially illuminate subsections of each pixel. The basics of the operation of the system are described in U.S. Pat. No. 5,036,385, the disclosure of which is incorporated herein by reference.

Figure 1:
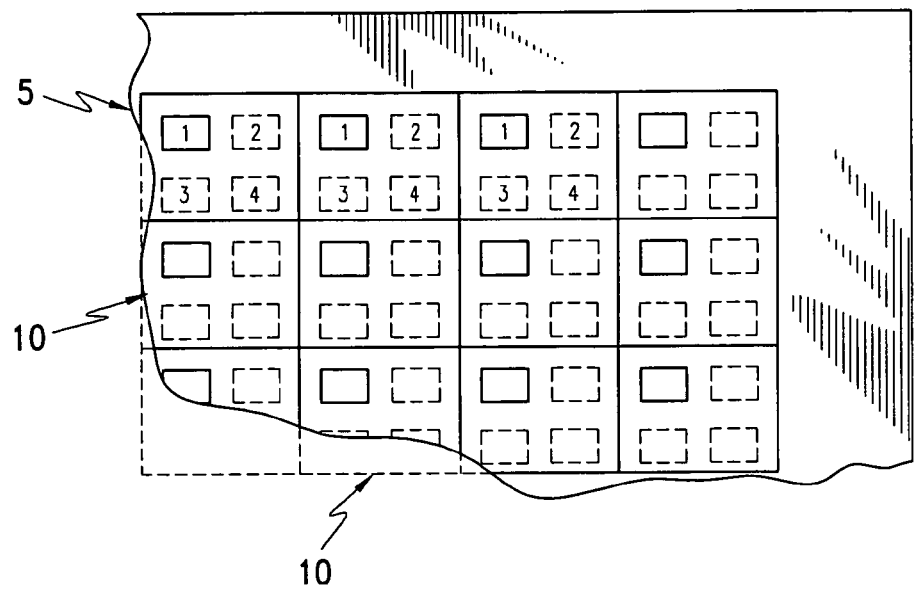
FIG. 1 is a view of a section of a transmissive LCD where different subregions of each pixel can be illuminated in a sequence.
Figure 2:
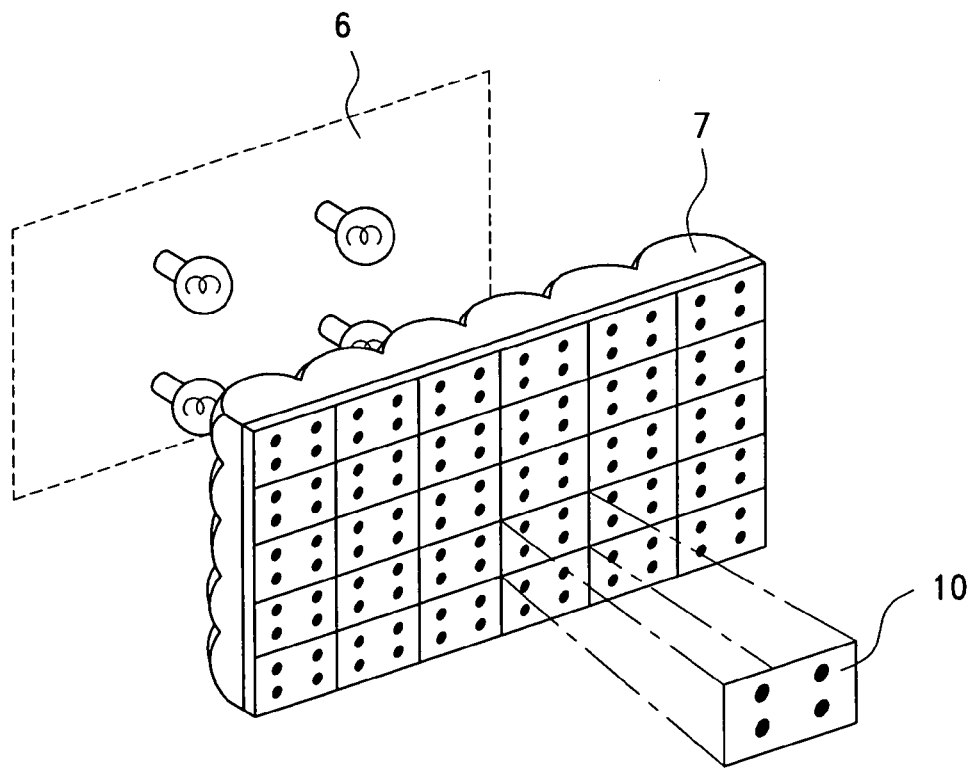
FIG. 2 is an illumination system involving lamps and flys eye lenses that can be used to direct light into the pixel subregions shown in FIG. 1.

Referring to FIGS. 1 and 2, light emitting regions 1, 2, 3, 4 are either situated a short distance behind the transmissive LC layer 5 of the display, or are projected onto the LC layer by appropriate optics. Although four regions are used in this example, in theory, any number can be used. Light emitting regions 1, 2, 3, 4 turn on and off in succession, so that first set of lights 1 is turned on, then this set of lights turns off and a set of lights 2 turns on, and this set of lights turn off and a set of lights 3 turn on, and so forth. When the set of lights 1 is on, the transparency of each pixel 10 on the LCD is changed to provide the correct apparent brightness for each of the illuminating regions so that an observer sees a partial image composed of regions 1. When the set of lights 2 is on, each pixel again changes its transparency so that the observer sees different parts of the same image made up of regions 2, and so on with the set of lights 3, 4. During each cycle, through the operation of the light emitting regions 1, 2, 3, and 4 in conjunction with the LCD, a complete image with resolution 2X×2Y is built up from the interaction of the X×Y resolution LCD and the pattern generated by light emitting regions 1, 2, 3, 4.

The light points can be generated by means of a small number of flashing light sources (in this case four) used in combination with a flys eye lens, in an arrangement similar to that shown in FIG. 2. According to this arrangement, one flys eye lens 7 is situated behind each pixel 10 of the LCD. As the light sources 6 flash on and off in their succession, their light is focused sequentially into four sets of light spots within the LCD pixels, as shown. It has been successfully demonstrated, using bright LEDs as the light sources, that this basic technique may create 256×256 images on a 128×128 pixel ferroelectric LCD that may operate at a speed of over 200 fields per second (fps). Although the light emitting regions shown are squares arranged in a grid pattern, in principle, other shapes and arrangements may be used.

Figure 3:
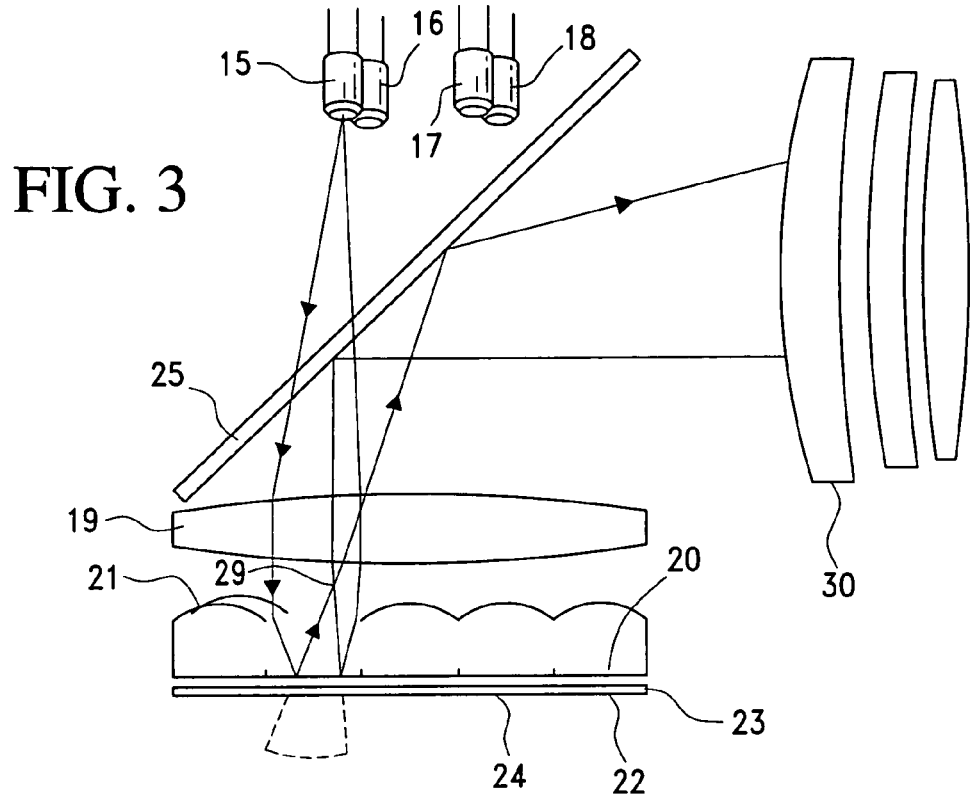
FIG. 3 illustrates an illumination and optical system according to this invention.

However, the resolution obtainable using this method is dependent on, and has been limited by, the response speed of the transmissive LCD. A first embodiment of this invention is illustrated in FIG. 3. According to the illustrated embodiment, four point-like light emitting sources 15, 16, 17, 18, in the form of fiber optics bundles, are provided. Of course, other numbers or types of light emitting sources could be employed, such as LEDs. Light sources 15, 16, 17, 18 are placed behind a field lens 19 and a flys eye lens 20. Flys eye lens 20 may consist of a sheet of glass or plastic having lenslets 21. A non-transmissive, reflective LCD 23, in this case an ICFLCD, is positioned adjacent the flys eye lens 20. A partially reflective mirror 25 is positioned between the light sources and the field lens 19. Mirror 25 may be a half-silvered mirror, or preferably, a polarizing beam splitter which transits light polarized in one direction and reflects light polarized the orthogonal direction. LCD 23 includes pixels 24. The size and arrangement of the flys eye lenslets 21 are such that one lenslet is situated in front of each pixel 24.

Lenslets 21 maybe spherical with rows and columns of lenslets having a pitch equal to that of the LCD pixels 24. The curvature of each lenslet 21 is such that its focal length is ideally twice the distance between the lens 20 and the reflective surface 22 of the reflective LCD 23. The field lens 19 preferably has a focal length equal to the distance between it and the light sources, and is placed directly in front of the flys eyes lens 20.

Light focused by each lenslet 21 passes through the LCD layer of the pixel 24 behind it and reflects back out through the lens, forming images of the light emitters near the lens surface, as shown in FIG. 3. One such image 29, of light source 15, is shown. Each lens "sees" an image of itself behind the reflective surface 22 of the LCD at a distance of one focal length. The lens thus creates an image of itself and the light coming through it at infinity. Since all the images created by all the lenses are at infinity, they will be coincident. The field lens 19 in turn causes this area at infinity to be refocused into a single small square area at one focal length from itself. Due to the partially reflective mirror 25, half of the light exiting the reflective LCD 23 is redirected into the viewing optics 30. With appropriate design, the square area into which the light is focused may be smaller than and coincident with the entrance pupil of the viewing optics. This results in highly efficient use of light compared to typical LCD based HMD systems which illuminate the LCD with diffuse light, most of which misses the viewing optics.

Light emitting regions 1, 2, 3, 4, as discussed in relation to FIG. 1, turn on and off in succession, causing light spots in front of each lenslet to turn on and off in succession. The LCD 23, through which the light passes, is used to modulate the intensity of the light to provide the appropriate gray levels to each spot. Thus, an image made up of the light spots is built during each four-flash cycle.

With proper sequencing of the illuminating regions, an LCD operating at N×30 frames per second can form almost flickerless images that have a resolution N times greater than the LCD itself. Accordingly, the faster the LCD, the more image sub-fields that can be displayed in ⅓₀th second, and the greater the resolution increase. The ICFLCD employed as reflective LCD 23 may have a pixel response time on the order of 0.1 ms and may be addressed at rates of up to 10,000 scans per second, yielding a completely different image with each scan and address. Thus, very high resolution images may be created using the sub-pixel illumination method and a reflective LCD.

Figure 4:
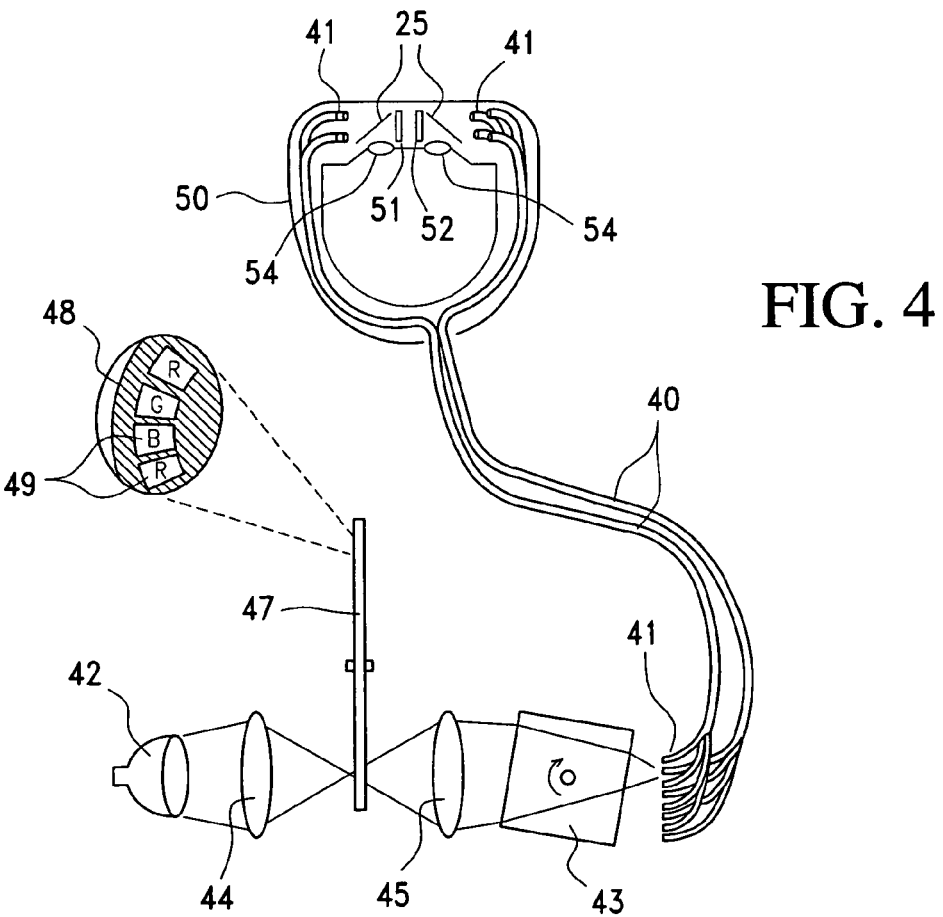
FIG. 4 illustrates an illumination and optical system in conjunction with a head mounted display.

ICFLCDs, DLPs (such as those manufactured by Texas Instruments) and other fast reflective light valves are monochrome devices. The preferred method of creating color images with these devices is the use of field-sequential color (FSC) illumination. According to this method, and referring to FIG. 3, light sources 15, 16, 17, 18 are caused to emit light of red, green, and blue color, in succession during subsequent fields, and the pixel transparencies of LCD 23 are changed to create red, green, and blue color components of an image in succession. This latter method has the advantage of high light throughput efficiency and low cost. An alternate illumination system for color generation and increased resolution is illustrated in FIG. 4. An advantage of this system is its ability to generate the very bright, very rapid flashing light sources desired for high resolution HMD applications. Eight bundle ends 41 of fiber optic cables are aligned in a row, and light from a halogen lamp or similar light source 42 is focused onto the bundle ends 41 via focusing lenses 44 and 45 and a rotating prism 43. Alternately, a rotating mirror could be used in place of prism 43. The rotating prism 43 serves to scan the beam across the bundle ends 41 as shown. Interposed between light source 42 and rotating prism 43 is a color filter wheel 47 containing discrete regions of red, green and blue, an exploded section 48 of color filter wheel 47 also being schematically illustrated in FIG. 4 with multiple sections 49 that are discussed below.

The bundles are routed into the rear of the head mounted device (HMD) 50 and then split. One set of bundle ends 41 is directed to a left eye ICFLCD system 51, and the alternate bundles ends 41 are directed to a right eye ICFLCD system 52. Partially reflective mirrors 25 may be disposed between each set of bundle ends and the ICFLCD systems 51 and 52.

The ICFLCD systems 51 and 52 may each include an ICFLCD, a flys eye lens and a field lens as in the system illustrated in FIG. 3.

In operating the system of FIG. 4, it is important that each ICFLCD 51, 52 receives no light during certain periods. While an ICFLCD is receiving no light, this LCD can be addressed and the pixels changed between fields to prevent blurring the image. Therefore, a gap is placed between the bundle ends 41 at the same side where they are illuminated by the light from the prism, so that as the beam exiting the prism passes through this gap between the bundle ends, no illumination enters the bundle ends and illuminates the ICFLCD.

Four bundles for each of cables 40 are illustrated in the described embodiment, but any number could be used, depending on how many light emitting sources it is desired to create in front of the reflective LCD. The bundles need not be large, for example, the bundle ends 41 may be on the order of 5 mm in diameter, given a typical light source.

If a large number of bundles is used, placing the bundle ends 41 in two or more rows may provide for a significantly more compact arrangement, but would require employing a beam scanner 43 that is a two (or multi) axis beam scanning system. At the other end, in the HMD 50, the bundle ends 42 may be rearranged to form square patterns, so that as the light beam scans the bundle ends, different corners of the square alternately light up and turn off. If more bundles were used, such as 9 or 16, squares of ends could be formed in front of each ICFLCD 51, 52, and the lighted area made to scan across each row of ends in sequence. The ends 42 may be lighted in any other order by rearranging them.

The color filter wheel 47 contains the multiple sections 49 along its edge within which are mounted sets of red, green, and blue color filters of different transparencies as shown in FIG. 4. The wheel rotates in synchronization with the rotation of prism 43 so that a complete set of red, green, and blue color filters of each transparency level (or gray level) is brought in front of the focused beam during the illumination of each of the fiber optic bundles.

The rotation rates of the prism and filter need not be excessive. As an example, if the filter wheel 48 has four sets of red, green, and blue filters, it may rotate at 5400 rpm, with the prism 43 rotating at 450 rpm, in the case where a twelve-fold resolution increase is desired. As an alternative to the color filter wheel, a liquid crystal electrooptical filter may be employed which changes its filtering characteristics rapidly to transmit red, then green, then blue light in succession. Such a filter, possessing the color changing speed necessary for this purpose, is made by Displaytech.

The illumination system illustrated in FIG. 4 may be employed with displays other than HMDs but this system offers advantages for HMD applications in that it is relatively compact and lightweight. Other technologies using miniature bright light sources may be practical in the future, allowing a more compact lighting system to be mounted within the helmet itself. Light sources include LED, electroluminescent, miniature fluorescent, and cathode luminescent lights, each of which represents potential light sources for this type of system, depending on the brightness and speed requirements.

When it is desired to create color images using FSC illumination, field-sequential sub-images representing different color components must be created to obtain a full color image. Thus, competition exists between the sub-images for available time necessary to represent color and increased resolution. Despite these tradeoffs, ICFLCDs still posses a greater potential for resolution increase than any other variation of LCD technology currently available.

As mentioned, ICFLCD systems 51 and 52 may each include an ICFLCD, a flys eye lens and a field lens as in this system illustrated in FIG. 3. An important design consideration is the need to place the flys eye lenslets very close to the pixels of the light valve. This is due to the small size of the pixels, and it is necessary to focus light into spots that are considerably smaller than the pixels themselves. Unfortunately, the smallest possible size of a light spot is limited by the size of the airy disk formed by the lens when imaging a pointlike light source. For example, the diameter of this disk in microns out to the first minimum, for yellow green visible light at a wavelength of 0.56 microns is related to the diameter of the lens forming it and the focal length of the lens by the formula D=2×F×tan(1.22×0.56/1)). The smaller the lens and the longer the focal length, the larger the minimum spot size. Since the pixels and lenses of the types of systems described are typically less than 20 microns on a side, a very short lens focal length, and thus a very short lens to pixel distance, is necessary to create sufficiently small spots on the order of 5 mm diameter. Since the light sources will always have some angular extent, an even smaller airy disk size is required. Given the typical light valves on the market today, with pixels sizes of around 12 microns, a lens to pixel distance on the order of 30 microns must be used.

Figure 5:
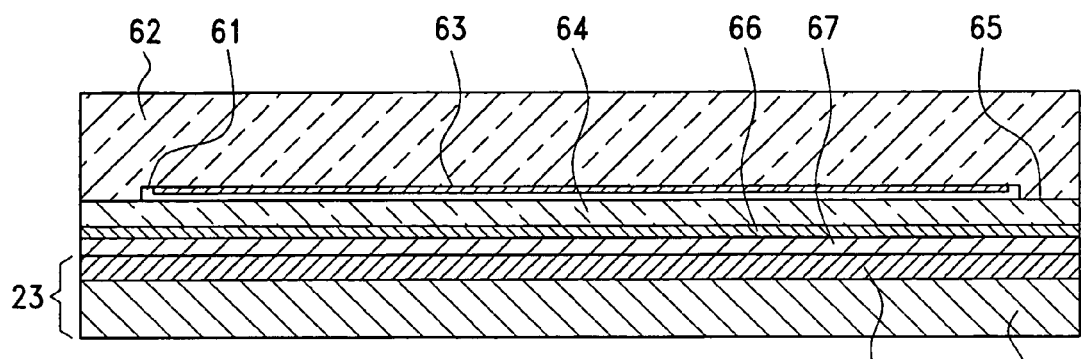
FIG. 5 is a cross-sectional view of a construction of an ICFLCD and lens assembly.
Figure 6:
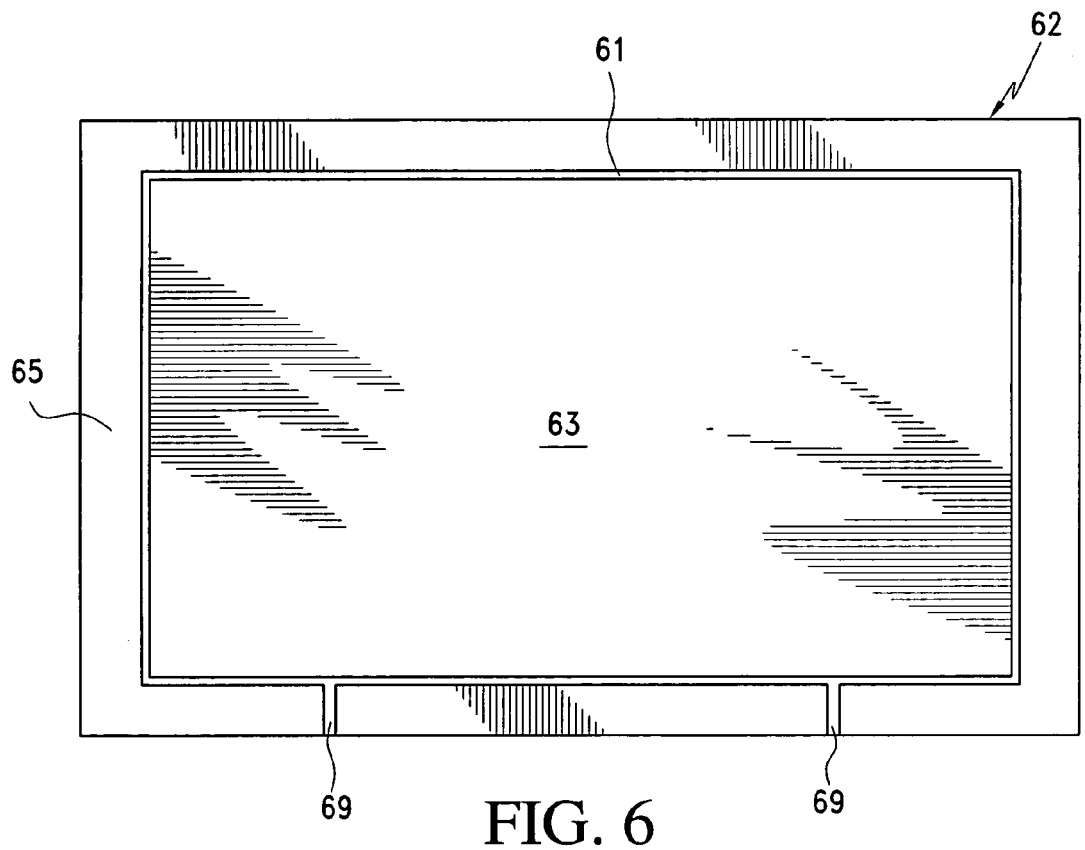
FIG. 6 is a top view of the construction of FIG. 5.

The front glass of ICFLCD light valves, and the protective glass of other types of reflective light valves, is typically much thicker than this dimension. Thinner glass presents difficulties due to handling and ease of breakage. However, a suitable construction that addresses these problems is illustrated in FIGS. 5 and 6. A very shallow well 61, typically no more than 1 micrometer deep, is formed in a relatively thick piece of glass 62, for example, using an etching process. An array of flys eye lenslets 63 is formed on the surface of glass 62 within the well 61, for example, by a similar etching process. Ideally, the highest points on the lenslets 63 would be raised only slightly less that the border 65 surrounding the well.

A second, very thin piece of glass 64 is placed over the well of the first piece of glass 61, and attached at the border 65 around the outside of the well 61. In addition to the well, a series of the channels 69, such as those shown, are etched between the well and the edges of the glass pieces 61, 64. These channels permit evacuation of air during those steps of the ICFLCD manufacturing and assembly process, such processes typically requiring forming a vacuum. A conductive ITO layer 66 is placed on the exposed surface of the thin glass piece 64. Alignment marking may be etched into one of the glass pieces to assist in alignment of the lenslets and the pixels of the ICFLCD. The whole assembly would be mounted to the front of the ICFLCD 23, with the ITO layer 66 on the thin glass piece in contact with the liquid crystal layer 67. As in typical ICFLCDs, there is also included a patterned conductive layer 68 which defines the pixels and a silicon substrate 70.

Figure 7:
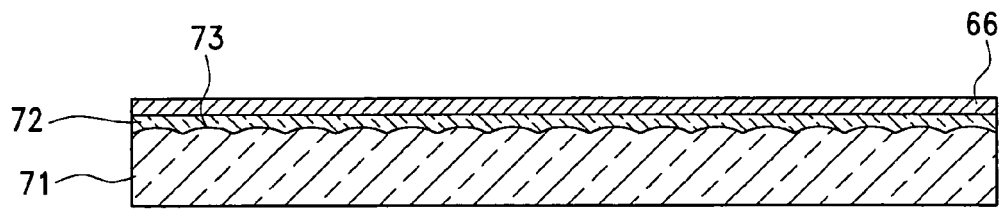
FIG. 7 illustrates an alternate construction of an ICFLCD and lens assembly.

An alternate construction is illustrated in FIG. 7. Here, a thick piece of glass 71 is provided, and a thin piece of glass 72 is provided, the two pieces having a different index of refraction. If the thick piece has an index greater than that of the thin piece, then convex lenslets 73 are formed into its surface, and the thin piece in turn has exactly mating concave lenslets are formed into its surface, for example, by etching. The two pieces are mounted face to face as shown. If the thick piece had an index less than that of the thin piece, then the positions of the convex and concave surfaces would be reversed. The ITO layer 66, as before, is placed on the opposed flat surface of the thin piece, with the ICFLCD liquid crystal layer of the ICFLCD (not shown in FIG. 7) adjacent the ITO layer 66.

Other methods of creating flys eye lenses on one surface of a thick piece of glass and mating a thin piece to it, or of forming flys eye lens arrays within a piece of glass, will be evident to those in the microlens fabrication industry.

Figure 8:
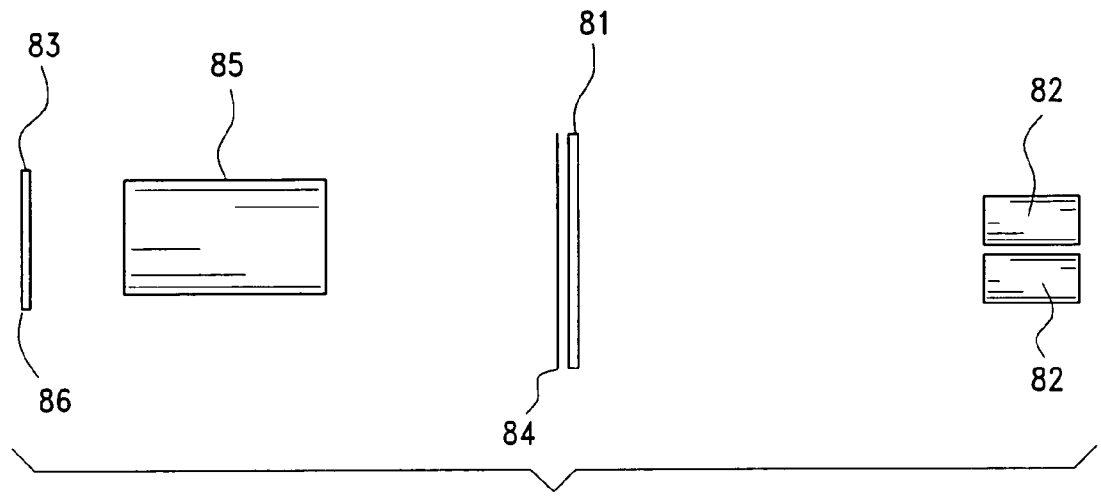
FIG. 8 illustrates a partial illumination and optical system for this invention.

In situations where the lenslets cannot be placed sufficiently close to the light valve pixels for one reason or another, one can use a flys eye lens that is separated by a considerable distance from the light valve and use a relay lens to focus light from the flys eye lens onto the pixels of the LCD. Such an arrangement is shown in FIG. 8.

The flys eye lens 81 forms light spots by focusing light from light source 82, but in this arrangement there is a considerable distance between the flys eye lens 81 and the reflective light valve (ICFLCD) 83. The light spots in this case are still formed in a plane 84 that is very close to the flys eye lens array 81. A relay lens 85, which is ideally a multi-element lens assembly with very low off axis distortion and aberration properties, is placed between the flys eye lens array 81 and the light valve 83, in such a way that the light spots formed by the flys eye lens array are imaged at the proper locations within the pixels of the light valve 83. In this case, it is usually best to image the spots directly onto the reflective surface 86 of the light valve.

There are many possible light sources to use for illumination in this type of system. LEDs, for example, have sufficiently rapid turn on and turn off times for use in this type of application and sufficient brightness for use in head mounted displays. These can be positioned in front of the flys eye lens array 81 similar to FIG. 2. LEDs are made by several different manufacturers. One made that is particular suited to this application is the Alphalight series made by Teledyne. These lamps use an array of red, green, and blue miniature lamps around a central reflective cavity. By turning first the red, then the green, and then the blue sets on and off, one can make the square central cavity flash red, green, and blue. Four or more LEDs of this type can be used to produce spots within the sub-pixel regions that turn on and off and also turn color from red to green to blue for field sequential color imaging.

Certain fluorescent lamp phosphors can be made to flash on and off with sufficient speed for use in this application. Banks of linear red, green, and blue lamps have been used to create colored lines within pixels in a previously build field sequential color direct view LCD system, as described in the paper "Development and Preliminary Evaluation of Field Sequential Color LCD Free of Color Breakup" published in the Society for Information Display International Symposium Digest of Technical papers. Volume XXV (Publisher: Society for Information Display, Santa Ana, Calif.).

It is also possible to create flashing light sources that change color from red to green to blue using steady light sources, such as halogen lamps, shining through an array of shutters and rapidly changing filters that alternately transmit red, then green, and then blue light, thus creating an array of lighted regions that sequentially turn red, green, and blue, and then off. Such color filters are made by Displaytech and by Colorlink. A separate shutter, for example a liquid crystal shutter, is typically required to cause each of the light emitting regions in the array to turn off (become opaque) after each flash sequence or prior to a color change.

All of these lighting technologies can be used either to create conventional field sequential color illumination or to create interleaved patterns of red, green, and blue lines or spots for breakup-free field sequential color. When employed in the present invention, enhanced resolution is achieved.

Figure 9:
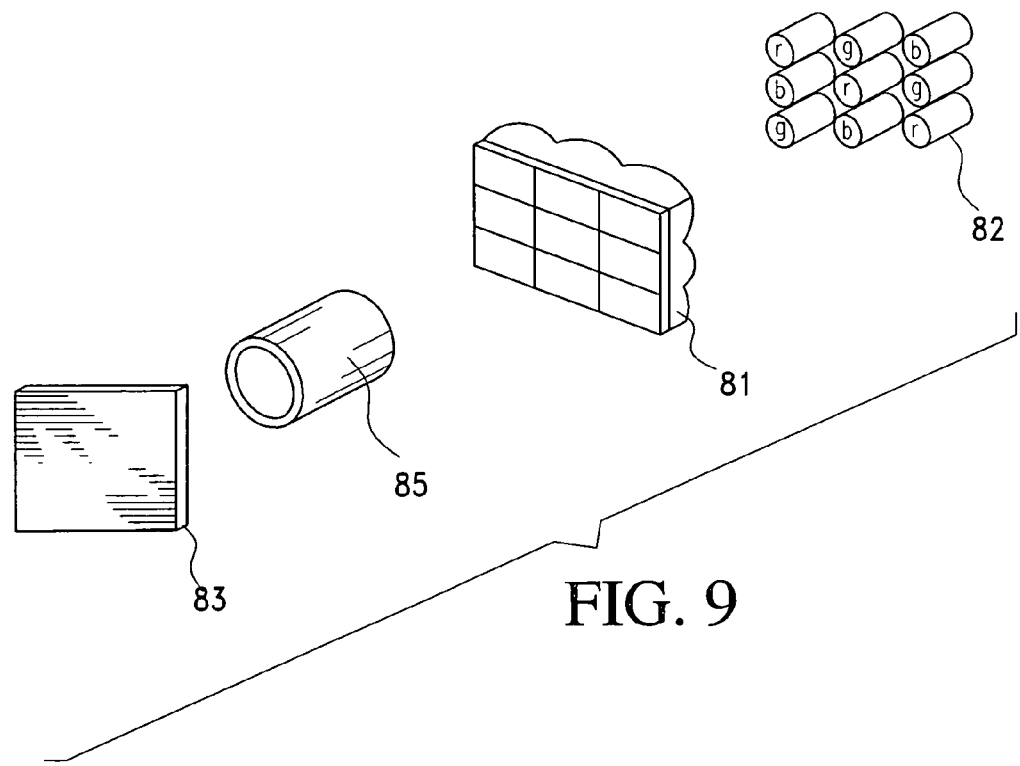
FIG. 9 is a perspective view of the system of FIG. 8.

FIG. 9 illustrates another arrangement where the light source 82 has the form of an array of nine lamps (LEDs), forming three rows of three lamps, one lamp in each row being colored red, one green, and one blue.

In U.S. Pat. No. 5,428,366, the disclosure of which is hereby incorporated by reference, a field sequential color illumination method was described whereby color could be created on a monochrome light valve without creating color breakup. This was accomplished by imaging red, green, and blue light spots or lines within pixels of the light valve, in such a way that spots of different colors are imaged simultaneously within different pixels of the light valve. This general method can be implemented using the optical arrangements of this invention while achieving enhanced resolution.

A field sequential color image is normally created on an LCD by using lighting systems that are caused to emit red, green, and blue light, in succession during subsequent fields, while the pixel transparencies are changed to create red, green, and blue color components of an image in succession. The lighting systems used to accomplish this usually involve either steady lamps behind rotating color filters, or flashing LEDs.

In FIG. 9, the LEDs can be made to flash on and off in sequence. In order to avoid color break up, patterns of red, green, and blue points or lines are imaged into the pixels in such a way that:

a) During each flash, red, green, and blue light is directed simultaneously to different, nearby pixels on the LCD, and b) During each three or multiple flash sequence, each pixel receives red, green, and blue light during successive flashes.

More specifically, in FIG. 9, each row of lamps is flashed on in sequence, and the sequence repeats steadily from top to bottom (or in some other order). The lenslets image light from the lamps into a series of repeating red, green, and blue lines immediately in front of each lenslets (plane 84 of FIG. 8) as each row of lamps flashes. The relay lens 85 in turn focuses light from the array of spots focused by the lens onto the pixels of the reflective light valve 83. The lines are focused so that during each flash, one line is focused into each of the pixels of the light valve 83. If each row of lamps flashes in sequence from top to bottom, the pattern of lines shown in FIGS. 10*a*, 10*b*, and 10*c* appear in sequence. Just before each lamp row is flashed, the light valve is scanned and each pixel caused to display one pixel of transparency information for the image color component of the color that is to be imaged into that pixel.

Figure 11:
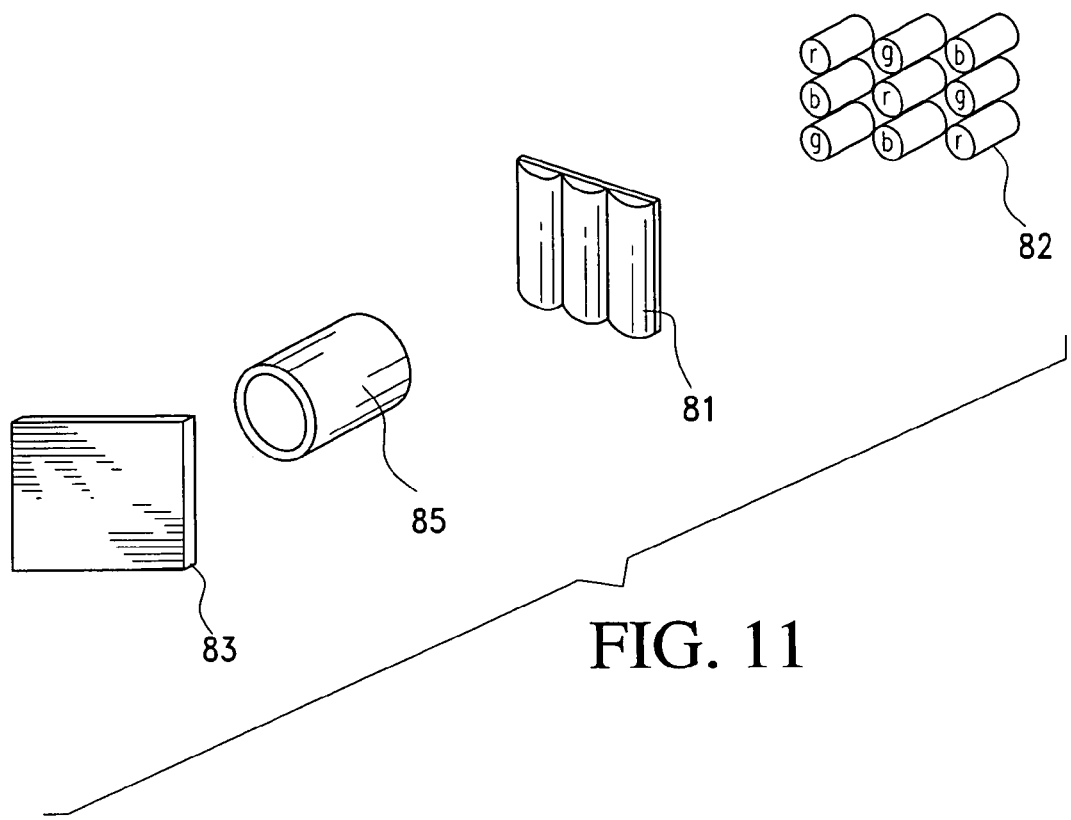
FIG. 11 illustrates a partial illumination and optical assembly similar to FIG. 9 but employing a lenticular lens.

Ideally, the flys eye lens 81 may be replaced by a lenticular lens 82, as shown in FIG. 11, with its long cylindrical lenslets oriented with their long axes in the direction perpendicular to the rows of lamps and the rows of the light valve 83.

Figure 12:
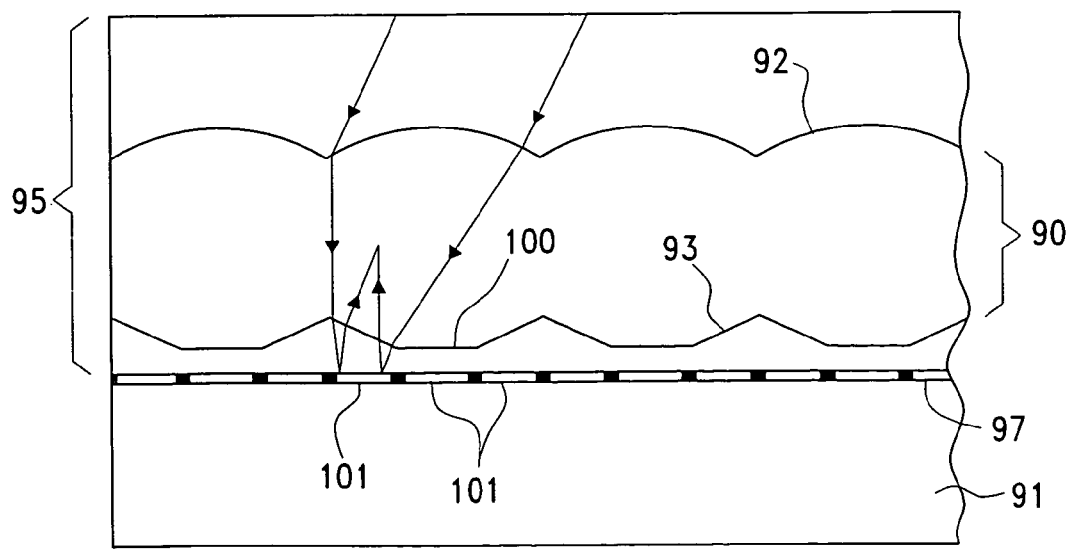
FIG. 12 is a partial cross-sectional view of another construction of an ICFLCD and lens assembly.

FIGS. 12 to 16 illustrate another embodiment of the invention that permits imaging of changing patterns of colored lines into adjacent pixels. This embodiment employs a lens array positioned close to the pixels. Referring to FIG. 12, a lenticular lens array 90 is placed very close to the pixels 101 of the light valve 91. This lens array 90 will generally have two surfaces: an outer (farthest from the pixels) concave surface 92 and an inner (nearest the pixels) multifaceted surface 93. For the described embodiment, each lenslet 100 at the multifaceted surface 93 has three flat facets as shown, one in the center parallel to the pixel surface, and one on either side angled outwardly. This lens array 90 may be built into the front (cover) glass 95 of the ICFLCD 91, and composed of material possessing an index of refraction greater than that of the surrounding glass 95. The pitch of the lenslets 100 will generally be equal or nearly equal to three times the pixel pitch, so that one lenslet 100 is positioned in front of each group of three pixels 101. Each of the facets on the inner multifaceted surface of a lenslets is placed in front of one column of pixels. In other words, each pixel 101 is matched with one of the three facets on lenslet 100. The concave outer surface 92 preferably has a curvature such that the focal plane for light entering it from an infinite distance source would be focused at some distance beyond the ICFLCD pixels and reflective layer 97; a distance of 1.4× the distance to the ICFLCD reflective layer is optimal in most circumstances.

Figure 13:
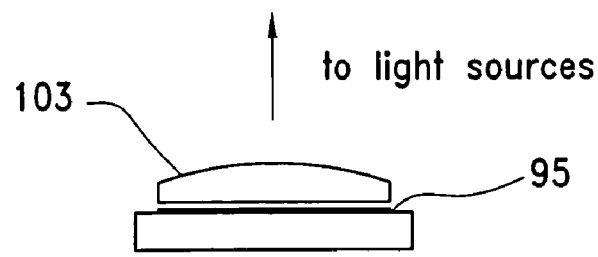
FIG. 13 illustrates the assembly of FIG. 12 with a collimating lens.
Figure 14:
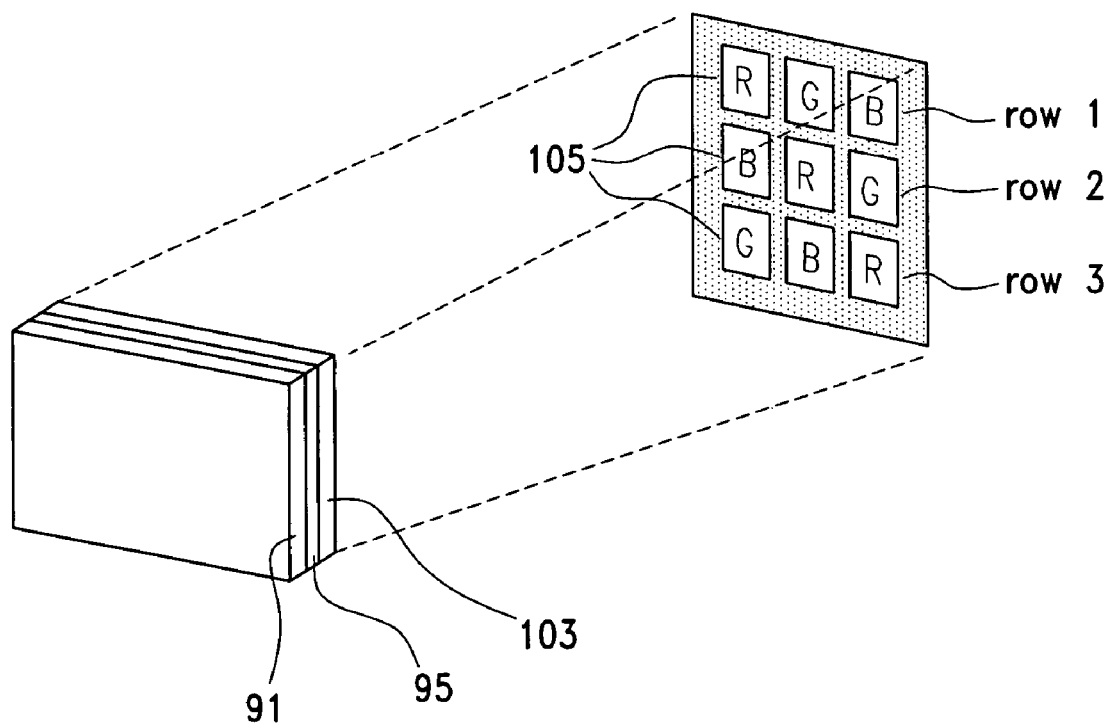
FIG. 14 illustrates a partial illumination and optical system employing the assembly of FIG. 12.

Three sets of light sources are mounted at a certain distance from the lenticular lens array 90, as shown in FIG. 14. In order to obtain efficient light throughput, it is generally preferred, as illustrated in FIG. 13, for a single collimating lens element 103 to be placed directly in front of the ICFLCD front cover glass 95. This collimating lens 103 preferably possesses a focal length equal to the distance to the plane where the light sources 105 are located. Thus, from the side of the lens 103 opposite the light sources 105, the light sources 105 would appear to be at infinity, and the light coming from them would be collimated to some degree by this lens.

The size and/or spacing of the light sources 105 is generally selected so that light emitted by any of the sources in the right column of the illustrated 3×3 array is focused into the pixel columns to the left side of each lens array element—this is illustrated by the arrows in the diagram of FIG. 12. Likewise, light from any of the sources in the central column would be focused into the pixel columns that are centered behind the lenslets, and light from any of the sources in the left column would be focused into the pixel columns to the right side of each lens element. To create a changing pattern of red, blue, and green lines necessary for breakup free field sequential color, each row of the array in FIG. 14 flashes on, then off, repeatedly, in succession; for example row 1 followed by row 2 followed by row 3, then back to row 1 again.

In this design, light from the sources 105 is actually focused by the lenses toward a plane about 1.4 times farther than the ICFLCD reflective layer 97. By the time the light hits the reflective layer, the wedge of light is focused down so that it hits only one column of pixels 101, as seen in FIG. 12. The light is reflected by the reflective layer so that it is focused into a thin line in a plane within the lens 100 part way between the lens and the reflective layer, as shown. Upon exiting the front lens surface 92 again, the light is focused so that, as seen from the other side of this surface, it seems to come from a spot located on a plane at the same distance behind the lens surface as the reflective layer is in reality.

Figure 15:
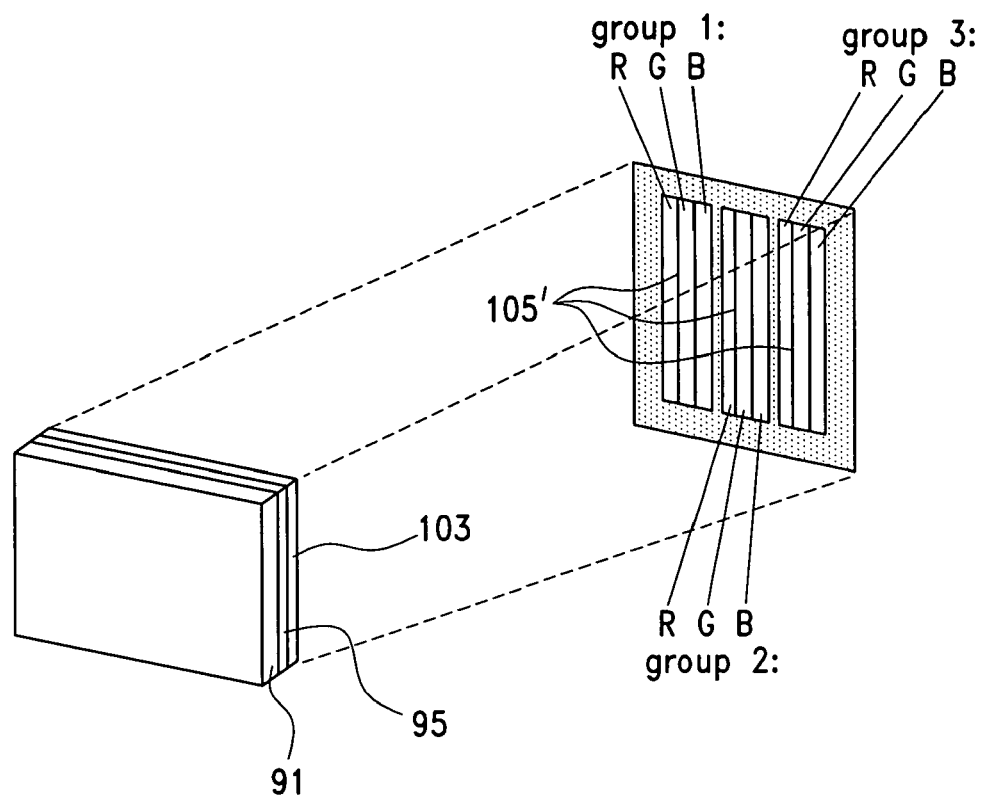
FIG. 15 illustrates an alternate partial illumination and optical system.

Variations on this design are, of course, possible. For example, the lenticular lens described above could be replaced by a flys eye lens, embedded in the ICFLCD front glass 95, with one flys eye element place in front of each group of nine pixels. The faceted surface, however, should still consist of linear structures running the length of the ICFLCD pixel columns or rows from top to bottom. In this case, the light sources should be linear in shape and long enough to ensure that light reaches all three rows of pixels behind each lenslet. In such a case, the three sets of light sources may be arranged in the pattern shown in FIG. 15. In FIG. 15 three groups of linear red, green, and blue sources 105' are shown, spaced apart horizontally. In operation, after the first ICFLCD scan, the red source in group 1, the green source in group 2, and the blue source in group 3 would come on at once, then turn off. After the next scan, the green source in group 1, the blue source in group 2, and the red source in group 3 would flash on together, then turn off. After the third scan, the blue source in group 1, the red source in group 2, and the green source in group 3 would turn on together, then turn off. This cycle would then repeat continuously.

Figure 16:
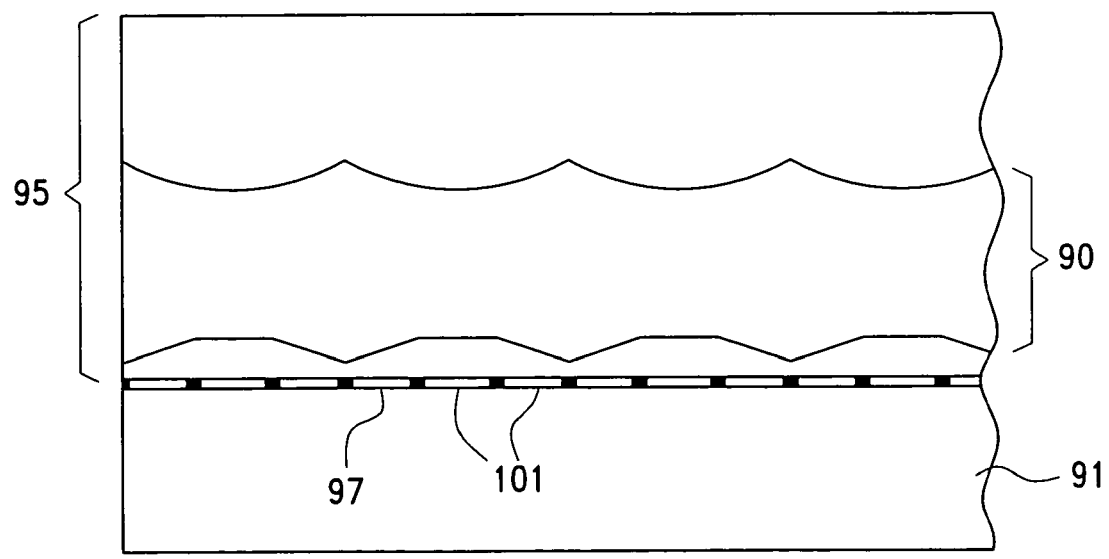
FIG. 16 illustrates an alternate ICFLCD and lens assembly.

It is also possible, as in previous configurations discussed, to use negative lenses instead of positive lenses made with glass or some other material possessing an index of refraction less than that of the surrounding glass it is embedded in. The negative lens equivalent of the lens array shown in FIG. 12 is illustrated in FIG. 16. Yet another variation involves using a convex surface in place of the three faceted surface shown in FIG. 12, or a concave surface in place of the three faceted surface shown in FIG. 16, to direct light into the pixels and then direct it out again.

The light sources shown can be of several types. For example, groups of LEDs can be used for head mounted applications. Rows of LEDs or groups of linear fluorescent lamps can be used as the linear sources shown in FIG. 10. Bright white sources such as halogen or arc lamps shining through changeable electronic color filters (such as products made by Colorlink and Displaytech) and electronic liquid crystal shutters can be used to create very bright groups of blinking light sources for projection applications.

In all cases when illuminating an ICFLCD from different point like or linear light sources, the timing of the illumination and ICFLCD scan sequence may proceed in a manner similar to the following. The process starts with the illumination off, and each subsequent scan and illumination period starts with the illumination off. First, the rows of pixels on the ICFLCD are addressed row by row and a voltage is applied across them in order to cause the liquid crystal molecules within the LCD layer to start rotating to turn each of the pixels on or off as necessary. These scan processes require a time period T1 to complete. The time period T1 can range widely, for example, from 10 μs-180 μs depending on the ICFLCD and its resolution. Next, during a time period T2, all the pixels on the ICFLCD, including the last ones addressed, complete their change to on or off. This time period is usually in the range of 75 μs-100 μ,s, but again may vary depending on the specific ICFLCD, and there also may be significant variation based on temperature differential. In this regard, maintaining an ICFLCD near the high end of its operating temperature range can reduce this time period considerably.

Next, the illumination source appropriate for the image being shown turns on at the end or near the end of time period T2. This illumination source may be any of the red, green, or blue sources displaying light at a certain position and of a certain intensity for the creation of light spots or lines and gray scale formation, as necessary. The light source is on for a period of time T3, the exact length of which depends on the amount of time available before the next image for the next field has to start forming; in the case of an ICFLCD that has to create gray scale by the time varying light source method, this time period may be on the order of 90 gs or less. If the ICFLCD has analog gray scale capability, then T3 could be much longer, on the order of several hundredths. At the end of time period T3, the illumination turns off. The end of T3 occurs at or close to the beginning of the next period T1, when the ICFLCD pixels are addressed again. The above process repeats continuously while images are being shown on the display.

It is noted that the embodiments described above in reference to FIGS. 9 to 16 will generally include a partially reflecting mirror positioned between the ICFLCD/lens assemblies and the light sources, as in the embodiments illustrated in FIGS. 3 and 4. Gray scale may be created for ICFLCDs and similar reflective light valves can be employed in this invention by methods generally known in the art in relation to transmissive LCDs.

Figure 17:
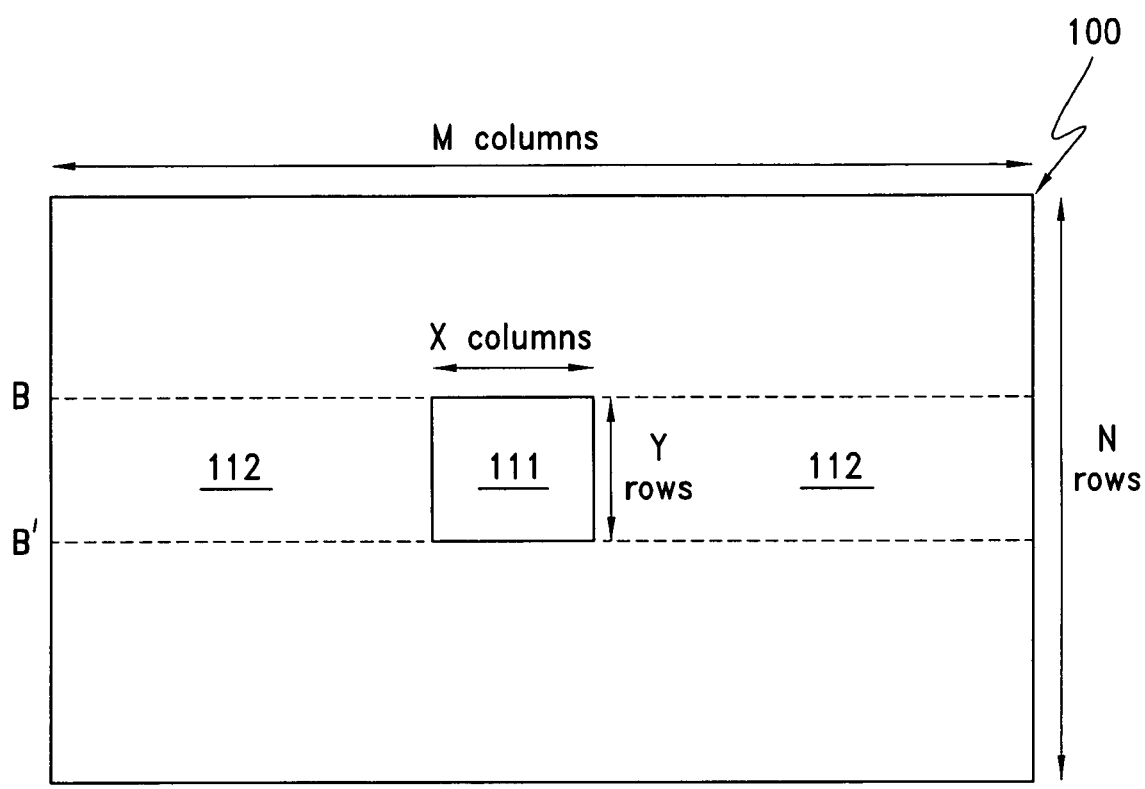
FIG. 17 illustrates a light valve having rows and columns of pixels.

It is possible to produce increased resolution only in a small area of the display, generally in the vicinity of the gaze point of the observer, in order to reduce the amount of data and the bandwidth needed to display the images. This is accomplished in the following manner, with reference to FIG. 17. Subregions of pixels of an M×N resolution light valve 110 are illuminated by light sources as described previously. As the light sources flash and the light spots are formed sequentially, the pixels within the smaller X×Y resolution area 111 are caused to change their transparency before each spot is imaged, in order to create an image formed by the spots instead of the pixels as described previously. Outside the area 111, the pixels always stay at the same level of transparency throughout a complete spot flash cycle during which all the subregions within each pixel are illuminated once. Thus, the image displayed outside the area marked 111 has a lower resolution, and is formed by the pixels of the light valve itself, instead of the light spots.

One specific way to accomplish this is simply to scan the entire light valve (for example, address each row in sequence from the top to the bottom) prior to the first illumination period, and change the state of each pixel to on, off, or an in between gray level, as is appropriate. An illumination cycle will be assumed, for the sake of the description of this embodiment, to be composed of a four flash cycle during which four lamps of the same color are used to illuminate appropriate gray level to display the part of an M×N image that is outside the area 111. These pixels stay at the same level of transparency throughout a complete four spot flash cycle. On the first scan, the pixels within area 111 are made to change reflectivity appropriate to displaying the pixels, formed by the light spots, of a 2X×2Y image composed of the light spots generated during the four flash cycle. During scans 2-4, only the pixels within the area 111 are changed to create an image with 2X×2Y resolution within area 111, where X is the number of pixel columns within area 111 and Y is the number of pixels rows within area 111. This 2X×2Y image would normally be a high resolution section of the larger image in the area surrounding it outside the area 111. The other pixels, being unchanged for the scans 2-4, would display an M×N resolution image outside the area 111. The process would repeat during each of the four flash cycles.

Most of the miniature reflective light valves, such as ICFLCDs, typically possess pixels that will remain in whatever state they are placed in by scanning long after they are addressed. In other words, it is typically not necessary to address pixels that do not change between one scan and another. Since only pixels within the area 111 change during every scan, it is only necessary to scan the area between lines B and B' during the second, third, and fourth scan, and only necessary to address and change pixels within the area 111 itself during the second, third, and fourth scans. This method allows faster image creation because the repeated scanning during each frame only occurs around the area 112 (i.e., the area between lines B and B' and surrounding area 111) where the smaller high resolution image is being formed. In many situations it is possible to use this speed advantage to perform more scans within a given time period and illuminate more subregions within each pixel than is possible if the whole LCD were scanned.

It is also possible to move or resize the area 111 where the higher resolution image is being formed in response to user control or automatic control. For example, the high resolution area can be made to coincide with a window that can be freely moved and resized by the user in the manner normally associated with the Microsoft Windows operating system, Linux, Apple Macintosh operating systems, and others. For example, one could move the window to reveal high resolution images in certain windows, if those specific images required higher resolution to reveal details clearly. Conversely, one could cause the area within a window to contain the low resolution image and the area outside to contain a high resolution image. It is also possible to cause area 111 to move in response to input from an eye tracker, as is often used in head mounted display systems. In such a case, the eye tracker would provide information on the observer's gaze point on the screen, and move area 111 so that it is always centered with respect to the gaze point. The area 111 would in this case display a high resolution section of the surrounding low resolution image on the rest of the display. In all cases, this movement may be accomplished by changing the location of lines B and B' within which multiple scans may occur during each frame, and region 111, within which the pixels are changed several times during each frame to create a 2X×2Y high resolution image.

It is noted that this feature, in which high resolution is displayed only within a certain area of interest whose location and size is controlled by the user or by some automatic means, may be applied to a transmissive display as well as a reflective display that employs the techniques described in this application or the similar variations described in U.S. Pat. Nos. 5,036,385; 5,410,345; and 4,428,366, which are by the same inventor and incorporated by reference.

The use of a fly's eye or lenticular lenses embedded in the front glass of the microdisplay requires a custom made microdisplay as well as departure from standard current manufacturing processes. It is advantageous to use a design that enables the fly's eye or lenticular lens to be added to the outside of the front glass after the microdisplay is manufactured. This allows the lenses to be simply added to a variety of standard off the shelf microdisplays without requiring customization by the microdisplay manufacturer or any change to the microdisplay manufacturing process.

Lenses can be placed inside the glass of the microdisplay to achieve a closer spacing to the pixels. Given the microdisplay glass thickness, this is the only way that lenses covering only one pixel can be placed close enough to the pixels to produce spots that are small enough, since the minimum spot size, as determined by the lens diffraction limit, is proportional to the width of the lenses and their focal ratio. These factors both put a limit on how far in front of a pixel the lens of the same size as the pixel can be situated.

An alternative for transmissive microdisplays is possible using one or more larger lenses mounted far enough back to still get sufficiently small spots. Each of these larger lenses can work in conjunction with several pixels to "cover" several pixels, and can be used in combination with extra light sources, as further described below, to allow spots to be directed into each of the pixels. Lenses about seven pixels wide would be large enough to allow mounting outside a typical 0.7 mm thick microdisplay glass and focus multiple spots within typical 15 micron wide pixels. One example of a lens array where a large lens directs light into several pixels is described in DTI's U.S. Pat. No. 5,428,366 titled "Field Sequential Color Illumination System for Liquid Crystal Display." The described lenses are mounted behind the transmissive display and each lens intercepts light from multiple light sources and focuses the light onto or near the pixel layer within groups of three pixels.

Figure 18:
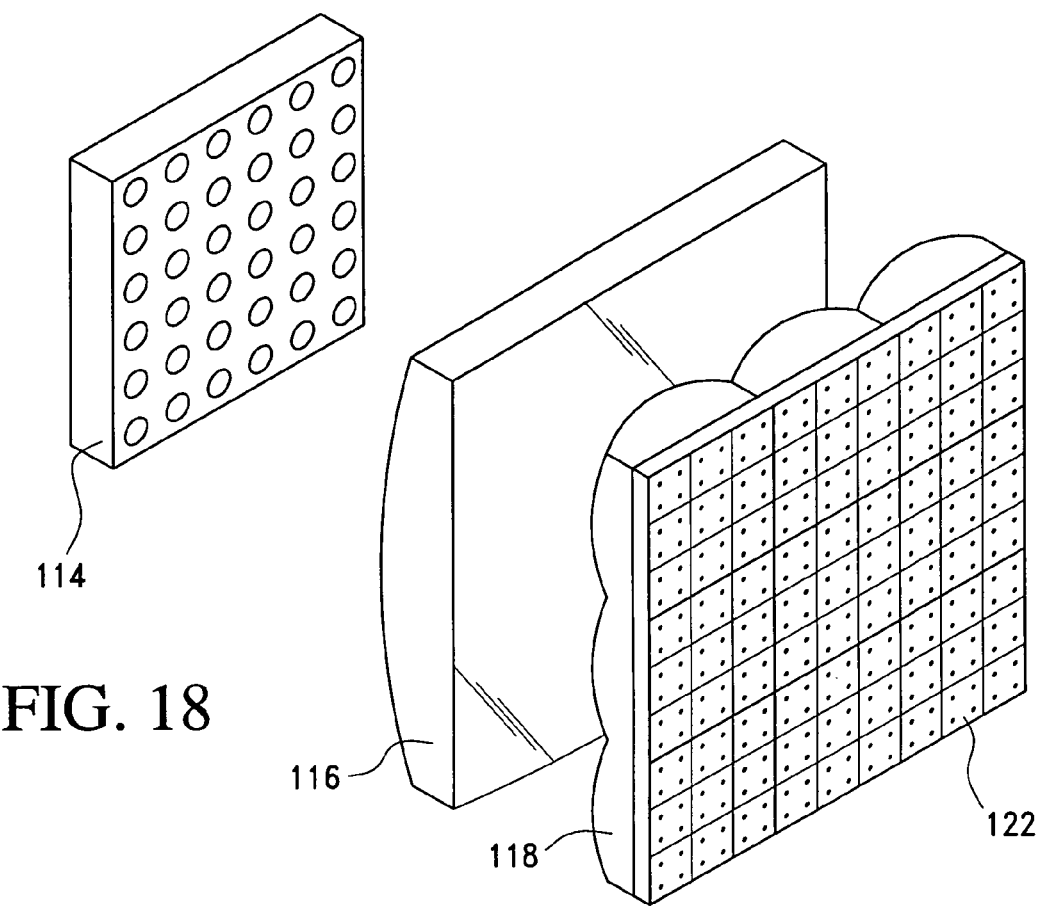
FIG. 18 illustrates a transmissive display with large fly's eye lenses.

FIG. 18 shows a light-source array 114, a collimating lens 116, a group of large fly's eye lenses 118 placed behind a transmissive LCD. Each lens is shown covering nine pixels in a 3×3 array although theoretically each lens could cover any number of pixels such as n pixels arranged in an X×Y array. It should be understood by those skilled in the art that the array could be almost any variety of sizes such as a 5×5, a 2×8, or an 8×7 array.

In this case a monochrome light source is shown, containing four groups with nine light sources in each. It would be understood by those skilled in the art that there could be any number of light-source groups with any number of light sources in each. For instance, there could be nine groups of 49 light-sources each when a lens with 7×7 pixels is used or there could be four groups of light-sources with 49 light-sources in each or any number of other combinations. Each light-source group of light sources flashes on and off in succession as is further described in DTI's U.S. Pat. No. 5,428,366. The light sources and lenses are positioned so that each lens images the nine members (or alternatively the n members) of each light-source group into a section, such as a quadrant or corner of the area defined by the nine pixels in front of the lens, so that during the four group flash cycle, a spot (light source image) is focused into the four corners of each pixel in succession. Thus, in this example, first all the upper left hand sides of the pixels receive light and then that is turned off and then the upper right hand side receives light and then that is turned off and then the lower left hand side receives light and then that is turned off and then the lower right hand side receives light and then that light is turned off. In this particular example, the pattern of flashing spots seen by an observer will be identical to that illustrated in FIGS. 1 and 2. One skilled in the art would realize that this sequence could occur in any order and any combination as long as all sections, in this case the four corners or sections of the display, receive light in a sequential manner to cover the required area. For example, an alternative sequence for a 3×3 or 3n×3n array would be in slightly different order, such as one that would first focus light on the left hand side and then the right hand side and finally on the center in order to sequentially cover the area in a uniform pattern. It would be understood by one skilled in the art how this pattern could be changed to meet the demands of a particular situation.

This design, when coupled with a conventional lens in front of a reflective display will not work because in that situation the lens would magnify both the spots and the pixels behind it. This is due to the fact that a viewer views a reflective LCD through the lenses and thus the magnified pixels and spots would appear to overlap one another to a viewer viewing a reflective display. An additional problem occurs because with the large number of pixels covered by each lens it is unwieldy or impossible to effectively direct light cones into individual pixels and then have them focus near the lens surface on the way out, even using secondary surfaces like the facets shown in FIG. 17.

Figure 19:
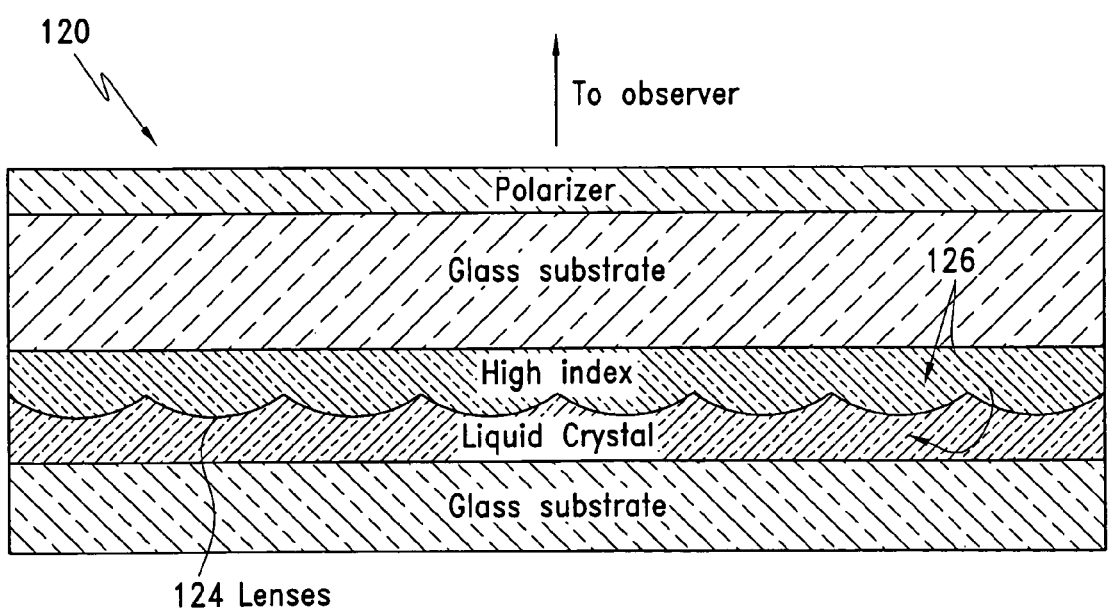
FIG. 19 illustrates a birefringent lens.

New embodiments allow larger lenses to be placed outside the cover glass of a reflective microdisplay by using a birefringent fly's eye or lenticular lens. FIG. 19 shows one embodiment of a birefringent lens 120. The birefringent lens 120 can focus light onto the pixels of the microdisplay 122 (such as those shown in FIG. 18) on the way in, but will not refocus the light on the way out, and thus will not magnify the pixels. One type of birefringent lens, as shown in FIG. 19, is made from a conventional glass or plastic lens material 124 embedded in a birefringent material 126 whose refractive index is identical to that of the lens material for light linearly polarized in one direction (in most cases being a direction within the plane of the lens array) but is considerably different from that of the lens material for light polarized in the orthogonal direction (again in most cases being a direction within the plane of the lens array). In FIG. 19 the birefringent material is a layer of liquid crystal material within which the lenses are immersed, however there are other types of birefringent material that can be used. When observed through a linearly polarizing filter with a polarizing direction parallel to the direction for which the indices of the lenses and birefringent material match, the lenses will appear almost invisible, and the pixels and spots behind them would be visible, without magnification, through the lenses.

Figure 20:
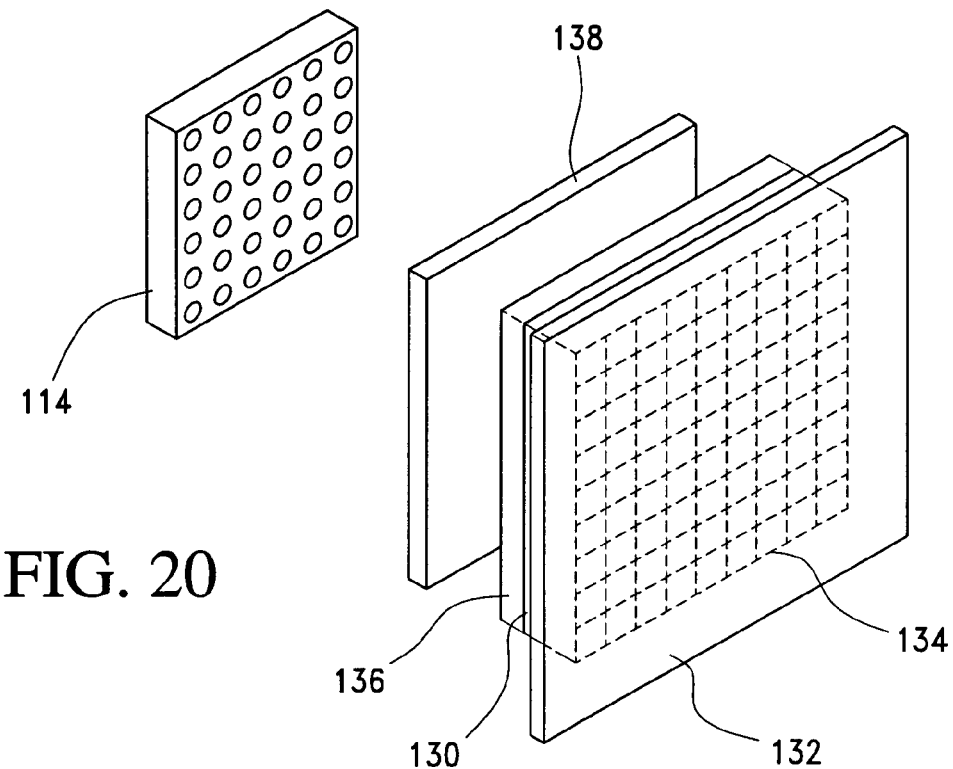
FIG. 20 illustrates a reflective display with large fly's eye lenses.

As shown in FIG. 20, the lens array 130 is mounted on the front of a reflective LCD 132. In order to allow mounting outside the cover glass of the LCD, large lenses would be used, with each lens covering a group of several pixels 134. A single collimating lens 136 would be placed on top of the lens array 130 as with previous embodiments, in order to make the light sources appear to be at infinity. A first polarizing filter 138 would be used to cause the light entering the lens array to be linearly polarized in the direction for which the indices of the lens material and the birefringent material do not match. This polarizing sheet would typically be placed between the light sources and the microdisplay. A beamsplitter, such as the one labeled 25 in FIG. 3, could also typically be placed between the first polarizing filter and the microdisplay, in order to direct light exiting the microdisplay over to a viewing optic or a projection lens. Each lens in the lens array would be designed to focus this polarized light on to or near the reflective layer of the pixels to form spots. The pixels, in order to form the image, would turn the direction of polarization to the orthogonal direction to create a white part of the image, or, if the LCD is an analogue device, could effect the polarization partway, creating elliptically or circularly polarized light in order to produce gray parts of the image. The polarized light thus modified would exit the microdisplay and be reflected by the beamsplitter. A polarizer in the optical path exiting the system, typically placed somewhere between the beamsplitter and a projection lens or viewing optic, would be oriented so as to only transmit the component of this light in the previously mentioned orthogonal direction, the direction where the refractive index of the birefringent material matches that of the lenses. Since the lenses do not affect this light, the spots will be clearly visible without magnification to any optics and/or observer observing this light on the other side of the second polarizing sheet. In a head mounted system the observer would view the microdisplay and spots through viewing optics; in a projection system a projection lens would project the microdisplay and spots onto a screen.

A birefringent lens is also potentially useful in the case where smaller lenses covering single pixels are mounted inside the microdisplay glass structure. Since the lenses won't focus light on the way out, they can be designed to focus the spots directly on the pixel layer, instead of near the lens surfaces on the way out. This allows the lenses to be mounted farther back from the pixel layer, which in turn allows the use of a thicker and easier to manufacture piece of glass between the lenses and pixel layer.

At least three configurations for such a lens are possible:
1. lenses molded into etched birefringent inorganic crystals;
2. lenses molded into etched birefringent organic retarding films, and;
3. lenses immersed in a layer of liquid crystal material.

Based on investigation it is believed that lenses immersed in a liquid crystal material or lenses molded into etched birefringent retarding films are the most practical to make and are able to achieve the required optical power. In the case of lenses molded into etched birefringent materials one would first etch a concave fly's eye or lenticular lens array into the birefringent material using processes known to the art, and then pour curable fluid, such as UV cured epoxy, over the resulting concave depressions, thus forming a layer of non birefringent material that fills the depressions. This layer could then be covered with a piece of glass and cured. The epoxy or similar material would have a refractive index equal or nearly equal to that of the birefringent material for light polarized in one direction, but the index of the birefringent material would be lower than that of the curable material for light polarized in an orthogonal direction.

Spot Movement Through Image Displacement

Figure 21:
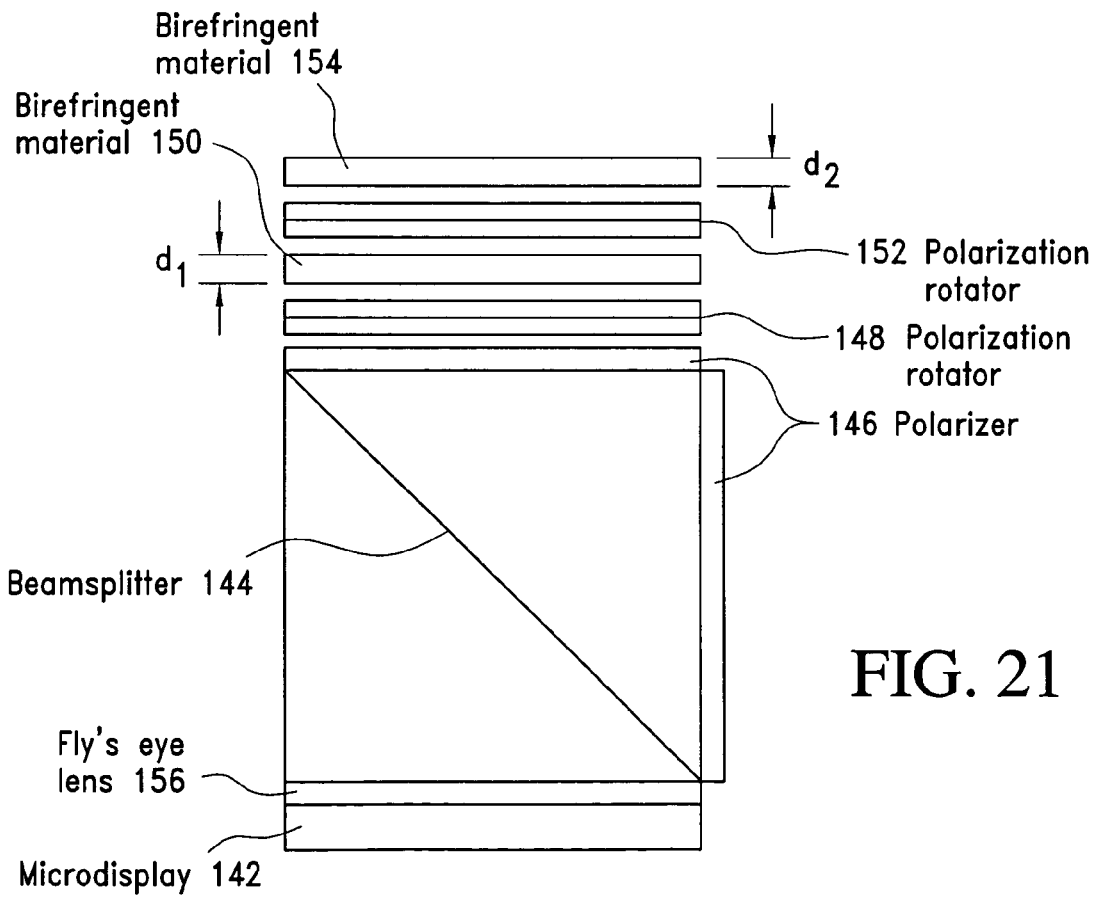
FIG. 21 illustrates stacked birefringent elements and polarization rotators.

Spot movement with any of the concepts described above (lens arrays with small lenses covering single pixels in transmissive or reflective LCDs, lens arrays with large lenses covering several pixels in a transmissive array, or birefringent lens arrays covering several pixels in a reflective LCD), can be accomplished through the use of a birefringent structure or other means that displace the image on the LCD slightly, instead of the use of multiple lamps that turn on and off. One such birefringent structure uses birefringent crystals or other materials placed in front of the LCD and its embedded or external/birefringent lens array. An example of birefringent structure 140 is shown in FIG. 21. The birefringent structure or stack includes a stack of components necessary to cause light points focused by the fly's eye lens to shift between four locations ½ pixel width apart in a square pattern as illustrated in this arrangement for use with a reflective LCD 142.

With the reflective LCD 142, the birefringent structure 140 is most likely placed between the beamsplitters 144, used for illumination, and the projection lens or viewing optic. A polarizer 146 will, in most cases, be situated between the beamsplitter 144 and the stack 140. Alternatively, with a transmissive LCD, this stack could be placed immediately in front of the polarizing sheet in front of the LCD.

A birefringent structure or stack 140 includes the following four elements or parts:

The first element (the element closest to the microdisplay 142 in FIG. 21) is a first liquid crystal (LCD) polarization rotator 148 that turns the polarization direction of light by 90 degrees when turned on. This first rotator 148 will not have any polarizers attached to it but will merely rotate the polarization direction of light exiting the polarizer in front of the beamsplitter 144 and/or the LCD.

The second element is a layer of birefringent material 150 of a thickness 'd' or '$d_1$' that is thick enough to cause the images of the spots seen through it to seem to be displaced by an appropriate distance, in this example ½ a pixel width when the polarization rotator constituting the first layer turns on and off. This birefringent material can include numerous types of crystals such as calcite, and various plastics used as retarding layers for the control of polarized light.

The third element is a second liquid crystal polarization rotator 152, also without polarizers, which turns the polarization direction of light by 90 degrees when turned on.

The fourth element is a second birefringent crystal 154 of a thickness 'd' or '$d_2$' with sufficient thickness to cause the images of the spots seen through it to be displaced in the vertical direction by an appropriate distance, in this case ½ pixel width, when the second polarization rotator is turned on.

The spots, undergoing their periodic displacements, will be observed and imaged through other optics located in front of the stack or polarization rotators and birefringent layers just described.

Figure 22:
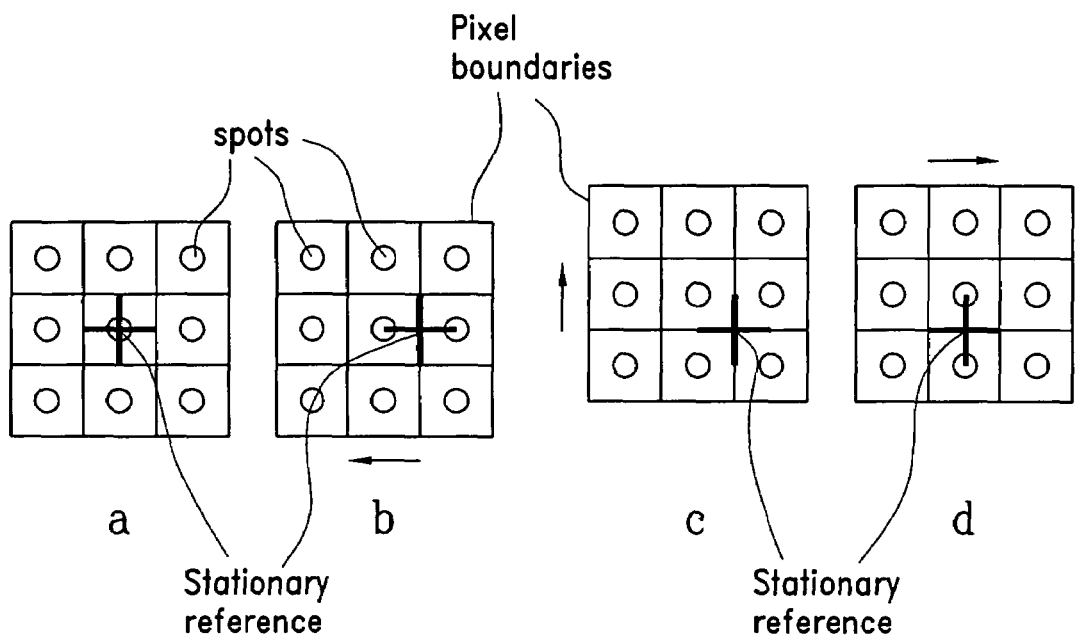
FIG. 22 illustrates pixel boundaries in rotators.

The system would operate as follows: During the first field, both rotators 148, 152 would be off, and the collection of light spots formed by the fly's eye lenses 156 in front of the LCD (and the surrounding pixel boundaries, which will be nearly invisible) would be in a certain apparent position as seen through the stack. This apparent position is shown in drawing "a" in FIG. 21. During the next field, one of the LC polarization rotators would be turned on, causing the spots to seem to shift by ½ pixel width in a certain direction. For this example we will assume that the direction is the X direction. The new apparent positions of the spots are shown in drawing "b" in FIG. 22. An imaginary stationary reference position is marked with the bold cross in this and the other drawings, to illustrate the displacement of the spots. Next, the second LC polarization rotator will be turned on, causing the apparent spot positions to shift in a perpendicular direction (the Y direction) by ½ pixel width, to the positions shown in drawing "c". Next the first LC polarization rotator will be turned off, causing the spots to shift to the positions in drawing "d." Lastly, both the LC polarization rotators turn off, the apparent spot positions shift back to the positions in drawing "a" and the cycle repeats.

The number of rotators and layers used is dependent on the number of positions and directions in which the apparent spot positions have to move. For example, if the spot needs to move between positions in a 3×3 array, then four rotators must be used alternating with four birefringent layers.

Figure 23:
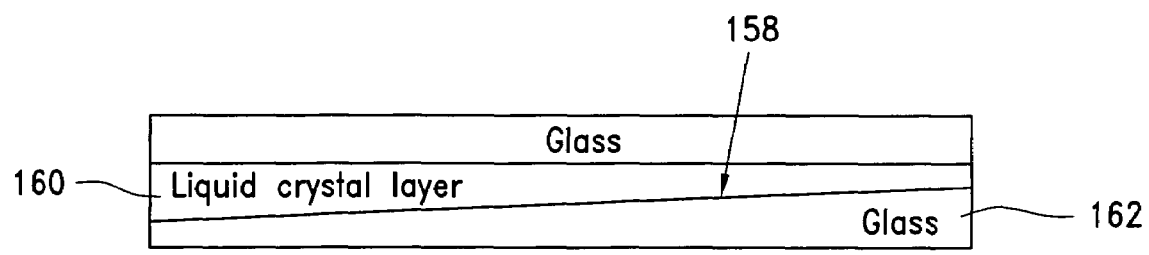
FIG. 23 illustrates another arrangement of birefringent layers.

An alternative to the use of birefringent layers interspersed with separate polarization rotators as shown in FIG. 21. In FIG. 23 the cross section of a prism formed by the interface 158 between a layer of liquid crystal material 160 and a glass or plastic substrate 162 is shown. When a voltage is placed across the LC layer 160, its molecules reorient themselves to produce a different refractive index for polarized light going through the layer. This causes the light to be deflected at a different angle at the solid layer/LC layer boundary 158 when the voltage is on versus off. This in turn causes the image of the spots and microdisplay to be deflected in a direction parallel to the slope of the interface or boundary 158. Two such prisms oriented at 90 degrees to one another could be used to cause displacement in the X and Y directions.

Figure 24:
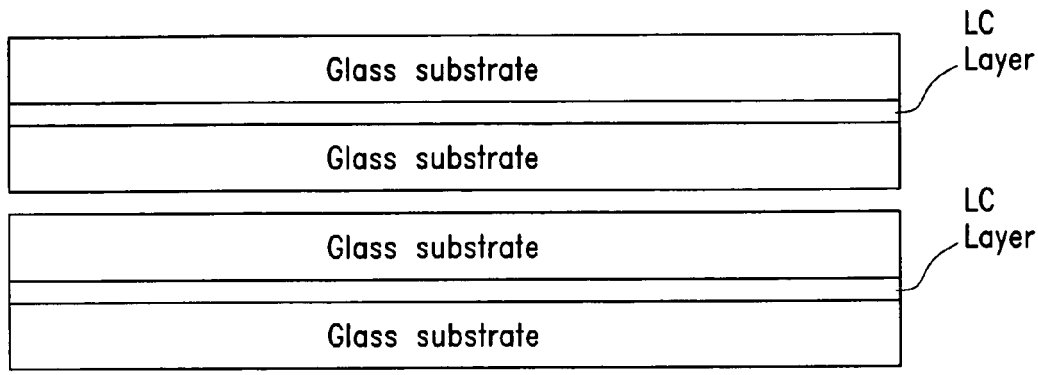
FIG. 24 illustrates another arrangement of birefringent layers.

Tokita, et al., in the paper titled "FLC Resolution Enhancing Device for Projection Displays," SID International Symposium Digest of Technical Papers, Volume 33; pages 638-641, described a liquid crystal deflector in which a thick (50 micron) layer of ferroelectric LC material is placed between two parallel plates of glass. By altering the tilt of the LC molecules through the application of an electrical field, one can cause the exit position of a beam to be shifted by several microns perpendicular to the glass surfaces, much as it would be with a birefringent crystal. This arrangement is shown in FIG. 24. Once again, at least two such assemblies are required to produce deflection in both the X and Y directions.

Figure 25:
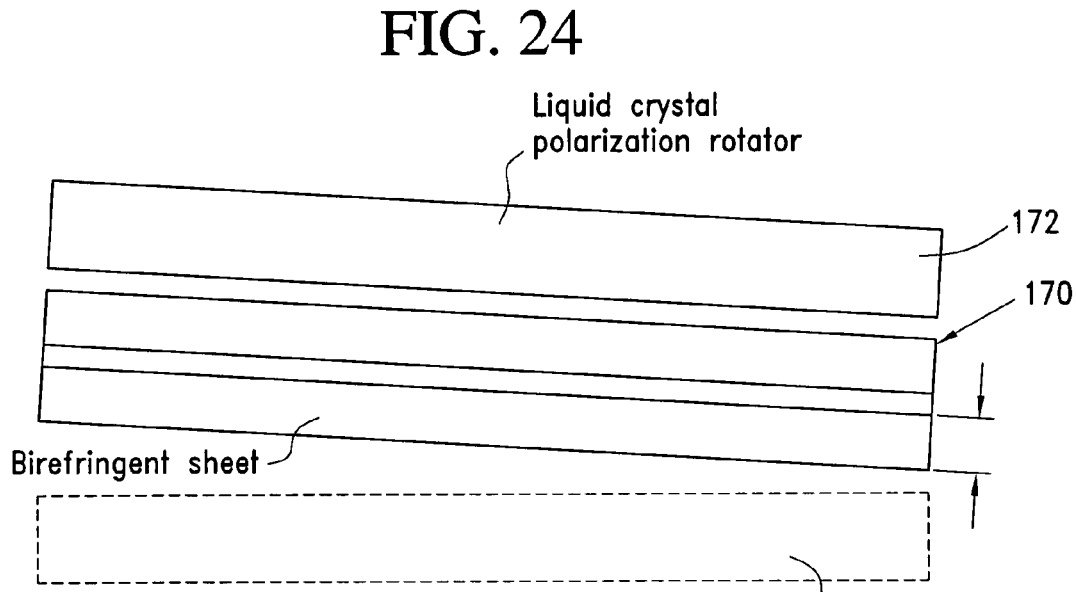
FIG. 25 illustrates another embodiment of this invention.

Another concept is shown in FIG. 25. In this figure, a birefringent layer 170 of the type commonly used as retarding film (and made by numerous manufacturers) has a slow axis and a fast axis substantially parallel to the surface of the sheet and at a 90 degree angle to one another. The sheet used for this application must have substantial thickness (t), at least on the order of one millimeter, given the delta n values for today's retarding films. One of these sheets is stacked with one active LC polarization rotator 172 and the sheet is tilted slightly with respect to the display 174, that is, rotated around the axis parallel to the horizontal dimension of the LCD, by several degrees. The LC rotator 172 may be tilted also. The second of these sheets is stacked with a second active LC polarization rotator and the sheet is tilted slightly with respect to the display around the axis parallel to the vertical dimension of the LCD. Again, the LC rotator may be tilted also.

Figure 26:
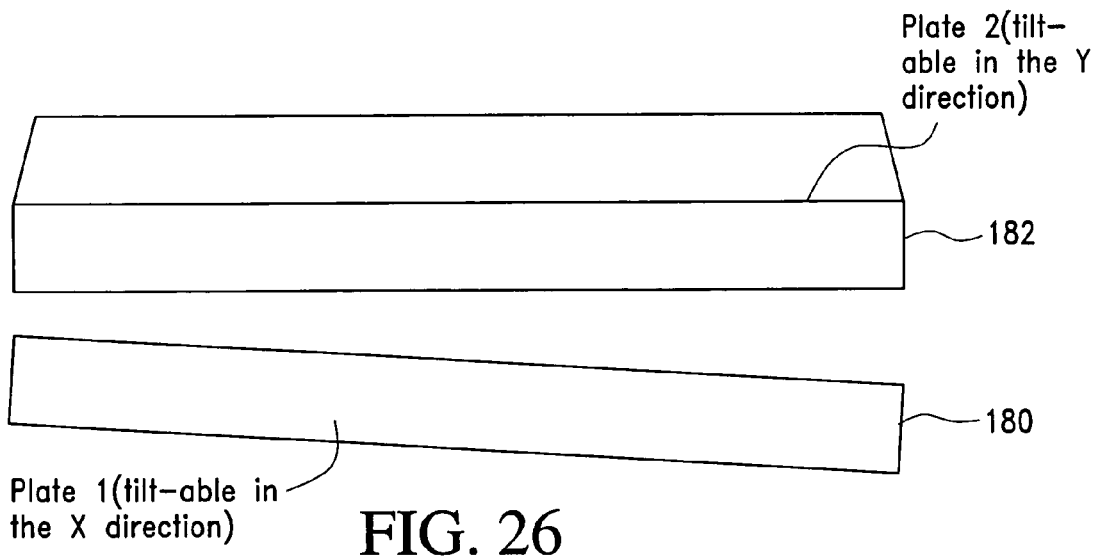
FIG. 26 illustrates another embodiment of this invention.

Another alternative is the use of flipping glass plates, as shown in FIG. 26. Here two glass plates 180, 182, ideally with parallel sides are used, mounted on two gimbaled arrangements to that one can flip back and forth in rotation about the X axis between two very close orientations, and the other can flip back and forth around the Y axis. If the plates are of the right thickness, the spots will shift by ½ pixel width as each plate rocks back and forth between the two positions. By flipping the plates back and forth at a 60 cycle rate it is possible to cause the spots to jump between four locations in a square pattern, as in FIG. 22.

The same type of image displacement could also, in principle be accomplished with a single plate that alternately flipped in the x and y directions. One or two flipping mirrors set at an angle to the LCD and flipping in one or two directions could also be used. Note that the farther such mirrors were from the LCD, the less of an angle that they would have to flip through.

As can be seen there are many ways to cause the image of the microdisplay and spots to seem to be displaced by small distances of half a pixel width or less and thus made to seem to jump from position to position.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A display device comprising:
   a reflective light valve comprising a plurality of pixels, the reflective light valve comprising
      a reflective layer, a pixel layer, and a transparent layer adjacent the pixel layer, the transparent layer comprising a plurality of front lenses such that a front lens is situated in front of each pixel; and
   a light source that directs light to the front lenses.

2. The device of claim 1, wherein the light valve is an integrated circuit ferroelectric liquid crystal device.

3. The device of claim 1, wherein the front lenses are lenslets, each lenslet positioned in front of each pixel of the light valve.

4. The device of claim 1 wherein the pixel layer comprises a liquid crystal material.

5. The device of claim 3, wherein the lenslets have a focal length equal to approximately twice the distance between the lenslet surface and the reflecting layer of the light valve.

6. The device of claim 1, further comprising a reflector positioned between the light source and the light valve.

7. The device of claim 1, comprising a prism including a partially reflective surface disposed between the light source and the light valve.

8. The device of claim 1 comprising a relay lens disposed between the light valve and the front lenses.

9. The device of claim 1, comprising a rotating color filter wheel having discrete transparent sections of different colors disposed between the light source and viewing optics.

10. The device of claim 9, farther comprising a rotating prism located between the light source and viewing optics.

11. The device of claim 10, further comprising means for synchronizing the rotation of the color filter wheel and the prism.

12. The device of claim 10, comprising a bundle of optical fibers having opposite bundle ends directing the beam of light to the light valve.

13. The device of claim 1, wherein the light valve comprises a digital light processor.

14. The device of claim 1, wherein the light source comprises red, green and blue light sources.

15. The device of claim 14, further comprising means for synchronizing the red, green and blue light sources and the light valve.

16. The display device of claim 1, the reflective light valve comprising: a plurality of addressable pixels, each pixel comprising a plurality of pixel areas; and
   the front lens directs light from the light source to a different one of the pixel areas of each of the pixels on the light valve.

17. The device of claim 1, wherein an outer surface of the front lenses is concave.

18. The device of claim 1, wherein an outer surface of the front lenses is convex.

19. The device of claim 1, wherein the front lens is a flys eye lens array or a lenticular lens array spaced from the light valve.

20. The device of claim 19, comprising a relay lens disposed between the light valve and the front lens.

21. The display device of claim 1, in which:
   the front lenses are sized and positioned such that each front lens is situated in front of a plurality of pixels arranged in an array; and
   wherein the light source comprises a plurality of light-source groups so that each light-source group flashes in succession; the light sources and lenses positioned relative to each other so that an image of each light-source group is imaged onto a section of each array of pixels resulting in a focused light-source image being formed on each pixel array in succession.

22. The display of claim 21, wherein the lens is a lens molded into etched bireficingent inorganic crystals.

23. The display of claim 22, further comprising a beam-splitter intermediate the polarizing filter and lens array.

24. The display of claim 21, further comprising a single collimating lens and a polarizing filter between the light source and the lens array.

25. The display device of claim 21, in which the front lenses are embedded in birefringent material with a refractive index approximately equal to that of the lens for light linearly polarized in one direction.

26. The display of claim 25, wherein the direction is within the plane of the transparent layer.

27. The display of claim 25, the birefringent material comprising a layer of liquid crystal material.

28. The display of claim 25, the birefringent material further comprising retarding layers of crystals such as calcite or various plastics.

29. The display of claim 21, wherein the lens is a lens molded into etched bireficingent organic retarding films.

30. The display of claim 21, wherein the lens is immersed in a layer of liquid crystal material.

31. The display of claim 21, farther comprising a polarizing filter between the lens array and the viewing optics.

32. The display of claim 1 in which the reflective layer and the pixel layer are combined into one layer.

33. A head mounted display system comprising:
   a right eye light valve and a left eye light valve, each light valve comprising a plurality of pixels, the reflective light valve comprising a reflective layer, a pixel layer, and a transparent layer, the transparent layer comprising a plurality of lenses such that a lens is situated in front of each pixel; and
   a light source that directs light to the lenses.

34. A method of generating a high resolution color image comprising sequentially directing light of different colors from a light source to a light valve having a plurality of pixels and comprising a reflective layer, a pixel layer, and a transparent layer, the transparent layer comprising a plurality of front lenses such that a front lens is situated in front of each pixel.

35. The method of claim 34, in which transparent layer comprises at least one lens embedded in birefringent material.

36. The method of claim 34, wherein the step of sequentially directing light of different colors farther comprises turning a colored light in the light source on and off in succession, and changing a transmissivity of the pixels to create red, green, and blue color components of the image in succession.

37. The method of claim 34, further comprising focusing light from the light source to the pixels on the light valve, and directing light from the light valve to viewing optics.

38. The method of claim 34, wherein the light valve is an integrated circuit ferroelectric liquid crystal device.

39. The method of claim 38, wherein the light valve has a pixel response time of 0.1 ms or shorter.

40. The method of claim 34, wherein the front lenses are a flys eye lens or lenticular lens adjacent the valve.

41. The method of claim 34, in which the step of directing light of different colors comprises directing light from the light source through a rotating color filter wheel having discrete sections of different color transparencies.

42. The method of claim 41, further comprising directing light from the color filter wheel to a rotating prism and focusing a beam of light.

43. The method of claim 42, further comprising synchronizing rotation of the color filter wheel and the prism and sequentially providing focused beams of light of different color transparencies.

44. The method of claim 43, further comprising sequentially directing the focused beams of light of different color transparencies to bundle ends of bundles of fibers, and directing focused beams of light from opposite ends of the bundles to the pixels of the light valve.

45. The method of claim 34, comprising directing light of different colors from the light source to pixels of a right eye non-transmissive light valve and to pixels of a left eye non transmissive light valve to modulate intensity of light to create different color components of an image in succession, and providing light alternately to the light valves.

46. The method of claim 34, wherein the right eye and left eye light valves are disposed in a head mounted display.

47. A display device comprising a light valve comprising a front lens, a pixel layer, and a transparent layer adjacent to the pixel layer between the front lens and the pixel layer; the transparent layer comprising:
- a liquid crystal first polarization rotator that turns the polarization direction of light by 90 degrees when turned on;
- a first layer of birefringent material thick enough to cause the images of spots to be seen to be displaced by a distance 'd' when the polarization rotator turns on and off, located adjacent to the first rotator;
- a liquid crystal second polarization rotator which turns the polarization direction of light by 90 degrees when turned on, located adjacent to the first layer of birefringent material; and
- a second layer of birefringent material with sufficient thickness to cause images of the spots to be displaced in the vertical direction 'd'; when the second polarization rotator is turned on.

48. The display of claim 47, wherein the birefringent material is a thickness t capable of displacing the images a distance 'd'.

49. The display of claim 47, wherein the birefringent material is a thickness t capable of displacing images a distance equal to a ½ a pixel.

50. The display of claim 47, further comprising a single collimating lens and polarizing filter between the lens array and the viewing optics.

51. The display of claim 47, the birefringent material further comprising a second liquid crystal layer.

52. The display of claim 47, further comprising a liquid crystal polarization rotator adjacent the polarization filter.

53. The display of claim 47, the birefringent material further comprising retarding layers of crystals such as calcite or various plastics.

* * * * *

UNITED STATES PATENT AND TRADEMARK OFFICE
CERTIFICATE OF CORRECTION

PATENT NO.        : 7,417,617 B2
APPLICATION NO.   : 10/832029
DATED             : August 26, 2008
INVENTOR(S)       : Jesse B. Eichenlaub Page 1 of 1

It is certified that error appears in the above-identified patent and that said Letters Patent is hereby corrected as shown below:

Claim 22, (Column 20, line 33): Delete the word "bireficingent" and add the word <u>birefringent</u>.

Claim 29, (Column 20, line 51): Delete the word "bireficingent" and add the word <u>birefringent</u>.

Claim 46, (Column 22, line 4): Delete number "34" and add number <u>45</u>.

Signed and Sealed this

Sixteenth Day of December, 2008

JON W. DUDAS
*Director of the United States Patent and Trademark Office*